US006881483B2

United States Patent
McArdle et al.

(10) Patent No.: US 6,881,483 B2
(45) Date of Patent: Apr. 19, 2005

(54) CERAMIC AGGREGATE PARTICLES

(75) Inventors: James L. McArdle, Stillwater, MN (US); Scott R. Culler, Burnsville, MN (US); William P. Wood, Sarasota, FL (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/776,156

(22) Filed: Feb. 11, 2004

(65) Prior Publication Data

US 2004/0221515 A1 Nov. 11, 2004

Related U.S. Application Data

(63) Continuation of application No. 09/971,899, filed on Oct. 5, 2001, now abandoned.
(60) Provisional application No. 60/238,844, filed on Oct. 6, 2000, and provisional application No. 60/238,826, filed on Oct. 6, 2000.

(51) Int. Cl.$^7$ .............................. B32B 5/66; B24B 1/00
(52) U.S. Cl. ...................... 428/403; 428/404; 428/406; 428/407; 451/41; 451/526; 451/533; 451/534; 451/540; 51/235; 51/236; 51/307; 51/308; 51/309
(58) Field of Search ................................. 428/403, 404, 428/406, 407; 451/41, 526, 533, 534, 540; 51/235, 236, 307, 308, 309

(56) References Cited

U.S. PATENT DOCUMENTS

| | | |
|---|---|---|
| 1,910,444 A | 5/1933 | Nicholson |
| 2,194,472 A | 3/1940 | Jackson |
| 2,216,728 A | 10/1940 | Benner et al. |
| 2,768,087 A | 10/1956 | Bird |
| 2,958,593 A | 11/1960 | Hoover et al. |
| 3,041,156 A | 6/1962 | Rowse et al. |
| 3,079,243 A | 2/1963 | Ueltz |
| 3,118,265 A | 1/1964 | Shaver |
| 3,491,491 A | 1/1970 | Ueltz |
| 3,491,492 A | 1/1970 | Ueltz |
| 3,502,453 A | 3/1970 | Baratto |
| 3,637,360 A | 1/1972 | Ueltz et al. |
| 3,693,893 A | 9/1972 | McIntyre |
| 3,781,172 A | 12/1973 | Pett et al. |
| 3,828,801 A | 8/1974 | Merrill |
| 3,864,101 A | 2/1975 | Charvat |
| 3,874,856 A | 4/1975 | Leeds |

(Continued)

FOREIGN PATENT DOCUMENTS

| | | |
|---|---|---|
| DE | 26 08 273 | 12/1977 |
| DE | 29 41 298 A1 | 4/1981 |
| EP | 0 109 581 A2 | 5/1984 |

(Continued)

OTHER PUBLICATIONS

R. K. McGeary, "Mechanical Packing of Spherical Particles", *J. American Ceramic Society*, vol. 44, No. 10, pp. 513–522 (Oct. 1961).

(Continued)

*Primary Examiner*—Ieszek B. Kiliman
(74) *Attorney, Agent, or Firm*—Jennie G. Boeder

(57) ABSTRACT

Ceramic aggregate particles comprising a plurality of solid particulates bonded together by ceramic binding material and methods of providing a plurality of such particles having substantially uniform cross-sectional shape are provided. The ceramic aggregate particles may incorporate a high percentage of solid particulates. The ceramic binding material may closely conform to the outermost surfaces of the solid particulates contained within the ceramic aggregate particle. When abrasive particulates are employed as the solid particulates, abrasive articles can be made which provide consistent high cut rates and consistent surface finish over relatively long periods of time.

22 Claims, 4 Drawing Sheets

U.S. PATENT DOCUMENTS

| | | |
|---|---|---|
| 3,891,408 A | 6/1975 | Rowse et al. |
| 3,893,826 A | 7/1975 | Quinan et al. |
| 3,911,202 A | 10/1975 | Stine et al. |
| 3,916,584 A | 11/1975 | Howard et al. |
| 3,924,023 A | 12/1975 | Boranian et al. |
| 3,928,949 A | 12/1975 | Wagner |
| 3,955,942 A | 5/1976 | Cordon et al. |
| 3,990,479 A | 11/1976 | Stine et al. |
| 4,045,416 A | 8/1977 | Robson et al. |
| 4,065,407 A | 12/1977 | Bambrick |
| 4,073,096 A | 2/1978 | Ueltz et al. |
| 4,112,631 A | 9/1978 | Howard |
| RE29,808 E | 10/1978 | Wagner |
| 4,126,429 A | 11/1978 | Watson |
| 4,132,533 A | 1/1979 | Lohmer et al. |
| 4,194,887 A | 3/1980 | Ueltz et al. |
| 4,227,350 A | 10/1980 | Fitzer |
| 4,252,544 A | 2/1981 | Takahashi |
| 4,305,898 A | 12/1981 | Obersby |
| 4,311,489 A | 1/1982 | Kressner |
| 4,314,827 A | 2/1982 | Leitheiser et al. |
| 4,318,766 A | 3/1982 | Smith |
| 4,355,489 A | 10/1982 | Heyer et al. |
| 4,364,746 A | 12/1982 | Bitzer et al. |
| 4,364,877 A | 12/1982 | Clement et al. |
| 4,393,021 A | 7/1983 | Eisenberg et al. |
| 4,407,967 A | 10/1983 | Luks |
| 4,453,107 A | 6/1984 | Keenan |
| 4,456,498 A | 6/1984 | Churchland |
| 4,457,767 A | 7/1984 | Poon et al. |
| 4,486,200 A | 12/1984 | Heyer et al. |
| 4,518,397 A | 5/1985 | Leitheiser et al. |
| 4,541,842 A | 9/1985 | Rostoker |
| 4,543,107 A | 9/1985 | Rue |
| 4,562,275 A | 12/1985 | Speer et al. |
| 4,563,388 A | 1/1986 | Bonk et al. |
| 4,575,384 A | 3/1986 | Licht et al. |
| 4,588,419 A | 5/1986 | Caul et al. |
| 4,611,766 A | 9/1986 | Seifert |
| 4,623,364 A | 11/1986 | Cottringer et al. |
| 4,652,274 A | 3/1987 | Boettcher et al. |
| 4,652,275 A | 3/1987 | Bloecher et al. |
| 4,734,104 A | 3/1988 | Broberg |
| 4,735,632 A | 4/1988 | Oxman et al. |
| 4,737,163 A | 4/1988 | Larkey |
| 4,737,407 A | 4/1988 | Wycech |
| 4,741,743 A | 5/1988 | Narayanan et al. |
| 4,744,802 A | 5/1988 | Schwabel |
| 4,749,617 A | 6/1988 | Canty |
| 4,751,137 A | 6/1988 | Halg et al. |
| 4,751,138 A | 6/1988 | Tumey et al. |
| 4,751,743 A | 6/1988 | Ishino |
| 4,759,507 A | 7/1988 | Lynch et al. |
| 4,768,722 A | 9/1988 | Lynch et al. |
| 4,770,671 A | 9/1988 | Monroe et al. |
| 4,773,599 A | 9/1988 | Lynch et al. |
| 4,789,507 A | 12/1988 | Wesley et al. |
| 4,799,939 A | 1/1989 | Bloecher et al. |
| 4,800,685 A | 1/1989 | Haynes, Jr. |
| 4,814,029 A | 3/1989 | Butcher |
| 4,816,298 A | 3/1989 | Alderman et al. |
| 4,826,799 A | 5/1989 | Cheng et al. |
| 4,840,809 A | 6/1989 | Hsu |
| 4,848,041 A | 7/1989 | Kruschke |
| 4,881,951 A | 11/1989 | Wood et al. |
| 4,895,994 A | 1/1990 | Cheng et al. |
| 4,898,597 A | 2/1990 | Hay et al. |
| 4,900,698 A | 2/1990 | Lundsager |
| 4,903,440 A | 2/1990 | Larson et al. |
| 4,903,444 A | 2/1990 | Berndt, Jr. |
| 4,906,523 A | 3/1990 | Bilkadi et al. |
| 4,918,874 A | 4/1990 | Tiefenbach, Jr. |
| 4,933,234 A | 6/1990 | Kobe et al. |
| 4,951,427 A | 8/1990 | St. Pierre |
| 4,954,060 A | 9/1990 | Hsu |
| 4,960,441 A | 10/1990 | Pellow et al. |
| 4,964,883 A | 10/1990 | Morris et al. |
| 4,985,340 A | 1/1991 | Palazzotto et al. |
| 4,989,597 A | 2/1991 | Werner |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,028,483 A | 7/1991 | Chernega et al. |
| 5,038,453 A | 8/1991 | Kurita et al. |
| 5,039,311 A | 8/1991 | Bloecher |
| 5,042,991 A | 8/1991 | Kunz et al. |
| 5,051,200 A | 9/1991 | Srail et al. |
| 5,057,371 A | 10/1991 | Canty et al. |
| 5,061,294 A | 10/1991 | Harmer et al. |
| 5,078,596 A | 1/1992 | Carberry et al. |
| 5,085,671 A | 2/1992 | Martin et al. |
| 5,089,536 A | 2/1992 | Palazzotto |
| 5,090,968 A | 2/1992 | Pellow |
| 5,094,672 A | 3/1992 | Giles, Jr. et al. |
| 5,095,665 A | 3/1992 | Nagata et al. |
| 5,096,465 A | 3/1992 | Chen et al. |
| 5,110,332 A | 5/1992 | Isaksson |
| 5,118,326 A | 6/1992 | Lee et al. |
| 5,131,923 A | 7/1992 | Markhoff-Matheny et al. |
| 5,131,926 A | 7/1992 | Rostoker et al. |
| 5,137,542 A | 8/1992 | Buchanan et al. |
| 5,139,978 A | 8/1992 | Wood |
| 5,143,522 A | 9/1992 | Gibson et al. |
| 5,152,917 A | 10/1992 | Pieper et al. |
| 5,160,509 A | 11/1992 | Carman et al. |
| 5,164,348 A | 11/1992 | Wood |
| 5,178,644 A | 1/1993 | Huzinec |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,219,462 A | 6/1993 | Bruxvoort et al. |
| 5,219,806 A | 6/1993 | Wood |
| 5,236,472 A | 8/1993 | Kirk et al. |
| 5,261,612 A | 11/1993 | Ftaiha |
| 5,282,875 A | 2/1994 | Wood et al. |
| 5,300,129 A | 4/1994 | Clark |
| 5,318,604 A | 6/1994 | Gorsuch et al. |
| 5,318,605 A | 6/1994 | Carman |
| 5,330,113 A | 7/1994 | Poser et al. |
| 5,360,587 A | 11/1994 | Brotz et al. |
| 5,366,523 A | 11/1994 | Rowenhorst et al. |
| 5,372,989 A | 12/1994 | Geigle et al. |
| 5,378,251 A | 1/1995 | Culler et al. |
| 5,378,252 A | 1/1995 | Follensbee |
| 5,417,726 A | 5/1995 | Stout et al. |
| 5,418,369 A | 5/1995 | Moore et al. |
| 5,427,595 A | 6/1995 | Pihl et al. |
| 5,429,647 A | 7/1995 | Larmie |
| 5,436,063 A | 7/1995 | Follett et al. |
| 5,443,906 A | 8/1995 | Pihl et al. |
| 5,453,106 A | 9/1995 | Roberts |
| 5,454,750 A | 10/1995 | Cosmano et al. |
| 5,489,204 A | 2/1996 | Conwell et al. |
| 5,496,386 A | 3/1996 | Broberg et al. |
| 5,496,387 A | 3/1996 | Culler |
| 5,498,268 A | 3/1996 | Gagliardi et al. |
| 5,498,269 A | 3/1996 | Larmie |
| 5,500,273 A | 3/1996 | Holmes et al. |
| 5,520,711 A | 5/1996 | Helmin |

| | | |
|---|---|---|
| 5,534,470 A | 7/1996 | Andrus et al. |
| 5,547,479 A | 8/1996 | Conwell et al. |
| 5,549,962 A | 8/1996 | Holmes et al. |
| 5,550,723 A | 8/1996 | Ullman |
| 5,551,963 A | 9/1996 | Larmie |
| 5,578,098 A | 11/1996 | Gagliardi et al. |
| 5,593,467 A | 1/1997 | Monroe |
| 5,609,706 A | 3/1997 | Benedict et al. |
| 5,611,829 A | 3/1997 | Monroe et al. |
| 5,628,952 A | 5/1997 | Holmes et al. |
| 5,645,618 A | 7/1997 | Monroe et al. |
| 5,645,619 A | 7/1997 | Erickson et al. |
| 5,649,984 A | 7/1997 | Sigalas et al. |
| 5,651,801 A | 7/1997 | Monroe et al. |
| 5,669,941 A | 9/1997 | Peterson |
| 5,679,067 A | 10/1997 | Johnson et al. |
| 5,690,705 A | 11/1997 | Holmes et al. |
| 5,714,259 A | 2/1998 | Holmes et al. |
| 5,725,162 A | 3/1998 | Garg et al. |
| 5,733,178 A | 3/1998 | Ohishi |
| 5,738,696 A | 4/1998 | Wu |
| 5,738,697 A | 4/1998 | Wu et al. |
| 5,756,409 A | 5/1998 | Van Dijen et al. |
| 5,776,214 A | 7/1998 | Wood |
| 5,779,743 A | 7/1998 | Wood |
| 5,830,548 A | 11/1998 | Andersen et al. |
| 5,840,405 A | 11/1998 | Shusta et al. |
| 5,855,632 A | 1/1999 | Stoetzel et al. |
| 5,863,308 A | 1/1999 | Qi et al. |
| 5,893,935 A | 4/1999 | Wood |
| 5,903,951 A | 5/1999 | Ionta et al. |
| 5,908,477 A | 6/1999 | Harmer et al. |
| 5,908,478 A | 6/1999 | Wood |
| 5,910,471 A | 6/1999 | Christianson et al. |
| 5,914,356 A | 6/1999 | Erbe |
| 5,942,015 A | 8/1999 | Culler et al. |
| 5,954,844 A | 9/1999 | Law et al. |
| 5,958,794 A | 9/1999 | Bruxvoort et al. |
| 5,961,674 A | 10/1999 | Gagliardi et al. |
| 5,975,988 A | 11/1999 | Christianson |
| 5,997,461 A | 12/1999 | Armington et al. |
| 6,013,222 A | 1/2000 | Douglas et al. |
| 6,054,093 A | 4/2000 | Torre, Jr. et al. |
| 6,056,794 A | 5/2000 | Stoetzel et al. |
| 6,096,107 A | 8/2000 | Caracostas et al. |
| 6,155,910 A | 12/2000 | Lamphere et al. |
| 6,171,224 B1 | 1/2001 | Phillips |
| 6,228,133 B1 | 5/2001 | Thurber et al. |
| 6,264,710 B1 | 7/2001 | Erickson |
| 6,319,108 B1 | 11/2001 | Adefris et al. |
| 6,451,077 B1 | 9/2002 | Rosenflanz |
| 6,454,822 B1 | 9/2002 | Rosenflanz |
| 6,458,731 B1 | 10/2002 | Rosenflanz |
| 6,521,004 B1 * | 2/2003 | Culler et al. ............... 51/298 |
| 6,551,366 B1 | 4/2003 | D'Souza et al. |
| 6,582,488 B1 | 6/2003 | Rosenflanz |
| 6,583,080 B1 | 6/2003 | Rosenflanz |
| 6,589,305 B1 | 7/2003 | Rosenflanz |
| 6,592,640 B1 | 7/2003 | Rosenflanz et al. |
| 6,596,041 B2 | 7/2003 | Rosenflanz |
| 6,607,570 B1 | 8/2003 | Rosenflanz et al. |
| 6,620,214 B2 * | 9/2003 | McArdle et al. ........... 51/298 |
| 6,638,601 B1 | 10/2003 | Follensbee |
| 6,645,263 B2 | 11/2003 | Keipert et al. |
| 6,645,624 B2 | 11/2003 | Adefris et al. |
| 6,666,750 B1 | 12/2003 | Rosenflanz |
| 6,669,749 B1 | 12/2003 | Rosenflanz et al. |
| 6,702,650 B2 | 3/2004 | Adefris |
| 6,706,083 B1 | 3/2004 | Rosenflanz |
| 6,790,126 B2 * | 9/2004 | Wood et al. ............... 451/41 |
| 2002/0066233 A1 | 6/2002 | McArdle et al. |
| 2002/0159019 A1 | 10/2002 | Pokorny et al. |
| 2002/0160694 A1 | 10/2002 | Wood et al. |
| 2004/0026833 A1 | 2/2004 | Culler et al. |

FOREIGN PATENT DOCUMENTS

| | | |
|---|---|---|
| EP | 0 306 161 A2 | 5/1984 |
| EP | 0 444 824 A2 | 9/1991 |
| EP | 0 530 983 A2 | 3/1993 |
| EP | 0 601 594 A1 | 6/1994 |
| EP | 0 306 162 B1 | 10/1995 |
| EP | 0 709 347 A1 | 5/1996 |
| JP | 52-27394 | 3/1977 |
| JP | 53-41833 | 11/1978 |
| JP | 62-079841 | 4/1987 |
| JP | 62-136373 | 6/1987 |
| JP | 3-161273 | 7/1991 |
| JP | 3-281174 | 12/1991 |
| RU | 2064941 | 8/1996 |
| SU | 933431 | 6/1982 |
| SU | 1555117 | 4/1990 |
| WO | WO 92/09543 | 6/1992 |
| WO | WO 93/12911 | 7/1993 |
| WO | WO 95/03370 | 2/1995 |
| WO | WO 95/11774 | 5/1995 |
| WO | WO 95/19871 | 7/1995 |
| WO | WO 96/10471 | 4/1996 |
| WO | WO 97/21531 | 6/1997 |
| WO | WO 98/04386 | 2/1998 |
| WO | WO 98/58769 | 12/1998 |
| WO | WO 99/42250 | 8/1999 |
| WO | WO 99/51400 | 10/1999 |
| WO | WO 99/56914 | 11/1999 |
| WO | WO 01/08880 A1 | 2/2001 |
| WO | WO 01/28140 A1 | 4/2001 |
| WO | WO 01/85393 A1 | 11/2001 |
| WO | WO 02/08143 A2 | 1/2002 |
| WO | WO 02/24446 A1 | 3/2002 |
| WO | WO 02/32832 A1 | 4/2002 |

OTHER PUBLICATIONS

R.N. Sylva, "The Hydrolysis of Iron (III)", *Rev. Pure Applied Chemistry*, vol. 22, pp. 115–132 (1972).

Misawa et al., "The Mechanism of Formation of Iron Oxide and Oxyhydroxides in Aqueous Solutions at Room Temperature", *Corrosion Science*, vol. 14, pp. 131–149 (1974).

R.C. Weast, *Handbook of Chemistry and Physics*, p. F–22 (1975), CRC Press, Cleveland, Ohio.

Matijevic et al., "Ferric Hydrous Oxide Sols", *J. Colloidal and Interface Science*, vol. 63, No. 3, pp. 509–524 (1978).

P.W. McMillan, vol. 1: Glass–Ceramics, 2nd Ed., Academic Press (1979).

Voight et al., "Formation of Pure Haematile by Hydrolysis of Iron (III) Salt Solutions under Hydrothermal Conditions", *Crystal Research and Technology*, vol. 21, No. 9, pp. 1177–1183 (1986).

"Modulus", *The Dictionary of Science*, p. 386 (1993), Lafferty and Rowe, Editors, Simon & Schuster, NY.

* cited by examiner

CERAMIC AGGREGATE PARTICLES

This application is a continuation of U.S. application Ser. No. 09/971,899, filed on Oct. 5, 2001, now abandoned; which application claims priority to U.S. Provisional Applications Nos. 60/238,844 and 60/238,826, both filed on Oct. 6, 2000.

FIELD OF THE INVENTION

The present invention relates to ceramic aggregate particles. In one embodiment, the present invention relates to abrasive ceramic aggregate particles comprising ceramic binder and a plurality of abrasive grains.

BACKGROUND

A variety of ceramic aggregate particles, for use in a variety of industries, exist. For example, catalyst pellets used in the hydrogenation of toluene and heptane can be made by combining a metal alloy, a high molecular weight polymer, and optionally a plasticizer (i.e., a transient solvent) into a mixture, forming the mixture into a shape, extracting the plasticizer (e.g., by solvent extraction), calcining the shaped mixture to remove the polymer, and then sintering the shaped mixture to provide catalyst pellets. Additional information can be found in U.S. Pat. Nos. 4,895,994 (Cheng et al.) and 4,900,698 (Lundsager). In the orthopedic and dental industry, hard, shaped, ceramic bodies are made by melting ceramic binder precursor, cooling the melt, and then crushing the cooled melt to provide ceramic bodies to be used in synthetic bone and dental compositions. Additional information can be found in U.S. Pat. No. 5,914,356 (Erbe). In the abrasives industry, ceramic aggregate particles can be made by forming a composition that includes a ceramic binder precursor and a temporary organic binder precursor, placing the composition into a mold, heating the composition in the mold to provide shaped particles, and sintering the shaped particles to burn off the organic binder and provide ceramic aggregate particles. Additional information can be found in U.S. Pat. No. 5,975,988 (Christianson). Other uses for ceramic aggregate particles include, for example, roofing granules, filtration products, hard coatings, shot blast media, tumbling media, brake linings, anti-slip and wear resistant coatings, retro-reflective sheeting and laminate composite structures.

There continues to be a need for new ceramic aggregate particles that are less costly to produce, require less process space, or require fewer steps than conventional techniques, or, that provide ceramic aggregate particles having similar or improved properties over those made by conventional techniques. For example, techniques for forming ceramic aggregate particles which do not require a molding step may provide a less expensive process. Additionally, techniques which do not require the use of solvents (e.g., toluene or heptane) are desirable.

A need also exists to provide ceramic aggregate particles which have relatively consistent shapes and sizes in order to provide greater consistency of performance to articles made with such ceramic aggregate particles. Regarding particularly abrasive articles, for example, there continues to be a need for abrasive particles which can provide abrasive surfaces with sustained consistent cut rates for, preferably, extended life times, with consistent work piece finish.

SUMMARY OF THE INVENTION

The present invention provides ceramic aggregate particles and methods for providing such particles. In one embodiment the invention provides abrasive ceramic aggregate particles.

In one embodiment the invention provides a plurality of ceramic aggregate particles; the particles comprising a plurality of solid particulates bonded together by ceramic binding material, wherein the plurality of solid particulates have an average particle size in the range from about 0.5 microns to about 1500 microns and the ceramic binding material and plurality of solid particulates are separate phases; and wherein a majority of said plurality of ceramic aggregate particles have a substantially uniform cross-sectional shape. By "a majority" it is meant that at least 50 percent, preferably about 90 percent, of the particles have a substantially uniform cross-sectional shape.

In another embodiment the invention provides a plurality of ceramic aggregate particles comprising a plurality of solid particulates bonded together by ceramic binding roofing granules, filtration products, hard coatings, shot blast media, tumbling media, brake linings, anti-slip and wear resistant coatings, retro-reflective sheeting and laminate composite structures.

There continues to be a need for new ceramic aggregate particles that are less costly to produce, require less process space, or require fewer steps than conventional techniques, or, that provide ceramic aggregate particles having similar or improved properties over those made by conventional techniques. For example, techniques for forming ceramic aggregate particles which do not require a molding step may provide a less expensive process. Additionally, techniques which do not require the use of solvents (e.g., toluene or heptane) are desirable.

A need also exists to provide ceramic aggregate particles which have relatively consistent shapes and sizes in order to provide greater consistency of performance to articles made with such ceramic aggregate particles. Regarding particularly abrasive articles, for example, there continues to be a need for abrasive particles which can provide abrasive surfaces with sustained consistent cut rates for, preferably, extended life times, with consistent work piece finish.

SUMMARY OF THE INVENTION

The present invention provides ceramic aggregate particles and methods for providing such particles. In one embodiment the invention provides abrasive ceramic aggregate particles.

In one embodiment the invention provides a plurality of ceramic aggregate particles; the particles comprising a plurality of solid particulates bonded together by ceramic binding material, wherein the plurality of solid particulates have an average particle size in the range from about 0.5 microns to about 1500 microns and the ceramic binding material and plurality of solid particulates are separate phases; and wherein a majority of said plurality of ceramic aggregate particles have a substantially uniform cross-sectional shape. By "a majority" it is meant that at least 50 percent, preferably about 90 percent, of the particles have a substantially uniform cross-sectional shape.

In another embodiment the invention provides a plurality of ceramic aggregate particles comprising a plurality of solid particulates bonded together by ceramic binding material, wherein the ceramic aggregate particles have a ceramic binder volume to solid particulate volume ratio in the range from about 0.2 to 2.0.

In yet another embodiment the invention provides a plurality of ceramic aggregate particles comprising a plurality of solid particulates coated and bonded together by a ceramic binding material, wherein the ceramic binding material coats each exterior surface of the solid particulate with a coating such that the exterior surface of the aggregate particle closely conforms to the outermost surfaces of the solid particulates contained therein.

Ceramic aggregate particles of the present invention can be used in products such as, for example, abrasives, roofing granules, filtration products, hard coatings, shot blast media, tumbling media, brake linings, anti-slip and wear resistant coatings, synthetic bone, dental compositions, retroreflective sheeting and laminate composite structures. As used herein, the word "ceramic" means inorganic, non-metallic material that may include a crystalline phase, a non-crystalline phase (e.g., glass), or a combination of both a crystalline and a non-crystalline phase (e.g., porcelain, glass-ceramic).

In another aspect, the present invention provides a method of abrading a surface, the method comprising contacting an abrasive ceramic aggregate according to the present invention, with a surface of a workpiece; and moving the aggregate or the surface relative to the other to abrade at least a portion of the surface.

In a further aspect, the present invention provides abrasive aggregates that have good grinding performance (e.g., long life, high cut rates, consistent cut rates, consistent surface finish and the like) in both coated abrasive and bonded abrasive applications. Additionally, the present method of making the ceramic agglomerates of the invention minimizes inventory, space for capital equipment, costs of capital equipment, and other associated manufacturing costs. The present invention provides methods that require relatively little space, and accordingly relatively low capital and operating costs.

DESCRIPTION

Ceramic Binder Material

Figure 1:
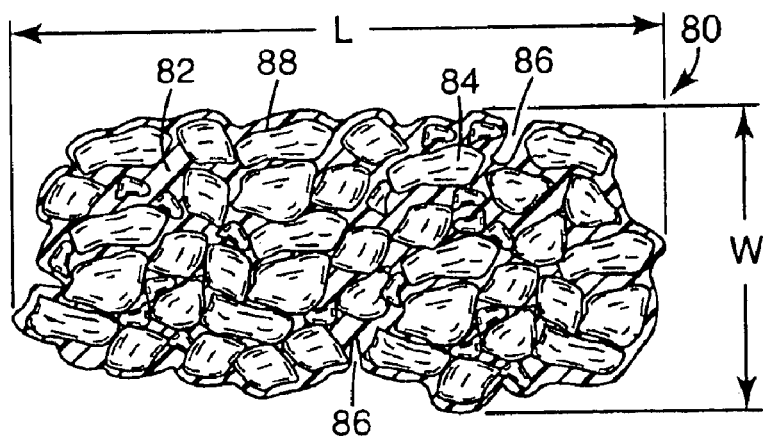
FIG. 1 is a schematic side view in elevation of an exemplary ceramic aggregate particle made according to a method of the present invention.
Figure 2:
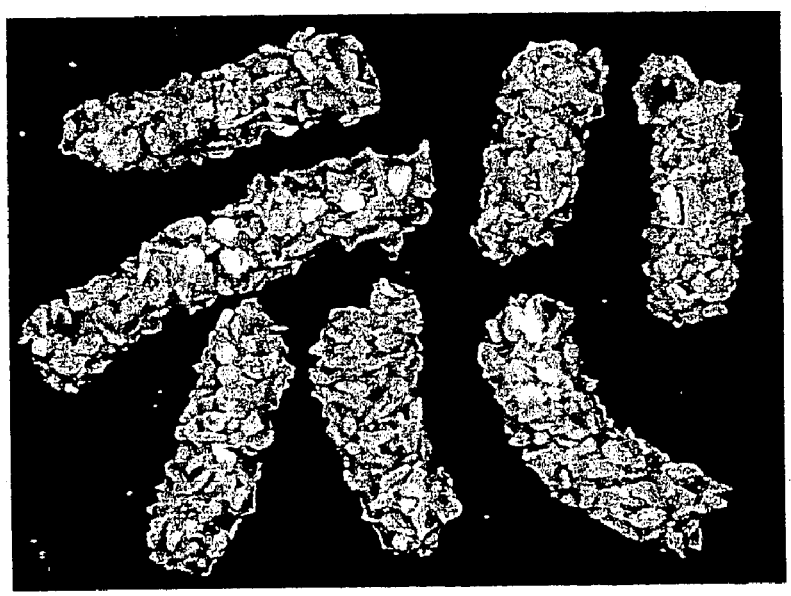
FIG. 2 is a printed, digitized image of an exemplary ceramic aggregate particle made according to a method of the present invention.

Ceramic binder material includes crystalline and/or non-crystalline ceramic materials. Useful crystalline ceramic binder materials include aluminum oxide, magnesium oxide, titanium oxide, zirconium oxide, alumina-zirconia, aluminum silicate, magnesium aluminate, magnesium silicate, boron carbide, silicon carbide, silicon-aluminum-oxynitride, titanium carbide, boron nitride, silicon nitride, silicon oxynitride, aluminum nitride, titanium boride, calcium phosphate, and combinations of these materials.

Useful non-crystalline ceramic binder materials are non-foaming and include fused silica, alkali silicate glass, alkaline earth silicate glass, lead silicate glass, borosilicate glass, aluminosilicate glass, aluminophosphate glass and combinations of these materials.

Useful ceramic binder materials which are combinations of crystalline and non-crystalline ceramic binder materials include lithium aluminosilicate glass ceramic, magnesium aluminosilicate glass ceramic, fluoromica silicate glass ceramic, porcelain, earthenware, stoneware, and combinations of these materials.

Solid Particulates

Preferably, at least a portion of the plurality of solid particulates are selected from the group consisting of abrasive grains, fillers, grinding aids, fibers, electronically active particulates, pigments, and combinations thereof. Typically, the plurality of solid particulates are selected so they do not decompose during heating. In one embodiment, the plurality of solid particulates have an average particle size in the range from about 0.5 micrometers to about 1500 micrometers. In another embodiment, the plurality of solid particulates have an average particle size in the range from about 10 micrometers to about 1500 micrometers. In another embodiment, for example, where the solid particulate is abrasive grain, the plurality of solid particulates have an average particle size in the range from about 125 micrometers to about 1500 micrometers. In another embodiment for other uses, the plurality of solid particulates have an average particle size in the range from about one micrometer to about 800 micrometers. In another embodiment, the plurality of solid particulates have an average particle size in the range from about one micrometer to about 400 micrometers. The size of the solid particulates means the longest dimension of an individual solid particulate from a given reference point.

Abrasive Grains

Exemplary abrasive grains that are useful in the present invention include fused aluminum oxide abrasive particulates, ceramic aluminum oxide abrasive particulates, white fused aluminum oxide abrasive particulates, heat treated aluminum oxide abrasive particulates, brown fused aluminum oxide abrasive particulates, silica abrasive particulates, silicon carbide abrasive particulates, green silicon carbide abrasive particulates, boron carbide abrasive particulates, titanium carbide abrasive particulates, alumina-zirconia abrasive particulates, diamond abrasive particulates, ceria abrasive particulates, cubic boron nitride abrasive particulates, garnet abrasive particulates, or combinations thereof. The ceramic aluminum oxide is preferably made according to a sol gel process, such as described in U.S. Pat. Nos. 4,314,827; 4,744,802; 4,623,364; 4,770,671; 4,881,951; 5,011,508; and 5,213,591, or by a process of sintering anhydrous alumina powders such as described in U.S. Pat. Nos. 5,593,467; 5,645,618; and 5,651,801, the disclosures of which are incorporated herein by reference. The ceramic abrasive grain comprises alpha alumina and, optionally, a metal oxide modifier, such as magnesia, zirconia, zinc oxide, nickel oxide, hafnia, yttria, silica, iron oxide, titania, lanthanum oxide, ceria, neodynium oxide, and combinations thereof. The ceramic aluminum oxide may also optionally comprise a nucleating agent, such as alpha alumina, iron oxide, iron oxide precursor, titania, chromia, or combinations thereof. The ceramic aluminum oxide may also have a shape, such as that described in U.S. Pat. No.

5,201,916 and U.S. Pat. No. 5,090,968 the disclosures of which are incorporated herein by reference.

It may be desirable for abrasive ceramic aggregate according to the present invention to comprise at least two distinct grades of abrasive particles (i.e., a first larger grade, and a second smaller grade). One measurement of the size of a sample of graded abrasive particles is the median particle size or $D_{50}$. As used herein "median particle size" or "$D_{50}$" for a sample of abrasive particles is equal to the abrasive particle size (typically specified as a diameter) for which 50% of the volume of the sample comprises abrasive particles which are smaller than the median volume particle size. As used herein "median particle size ratio" or "$D_{50}$ ratio" refers to the median particle size of the larger grade of abrasive particles in the agglomerate abrasive grain divided by the median particle size of any smaller grade of abrasive particles in the agglomerate abrasive grain. For example, for agglomerate abrasive grain according to the present invention comprising first and second abrasive particle grades having median particle sizes of 100 micrometer and 50 micrometers, respectively, the median particle size ratio or $D_{50}$ ratio is equal to 2. In agglomerate abrasive grain according to the present invention, the median particle size ratio can be, for example, about 2 or greater, about 3 or greater, about 5 or greater, or even about 7 or greater. It is also within the scope of the present invention to have more than two abrasive particle grades in the abrasive article. For example, the abrasive particle size distribution may contain three distinct grades of abrasive particle.

It should be noted that although the median particle size ratio for any two grades of abrasive particles is can be about 2 or greater, this does not preclude having abrasive particles of the same size in each grade. Since each abrasive particle grade comprises a distribution of abrasive particle sizes, overlap of the distributions is not precluded. For example, an abrasive grade having a $D_{50}$ of 30 micrometers and an abrasive grade having a $D_{50}$ of 60 micrometers may both contain abrasive particles having a size of 45 micrometers. As the $D_{50}$ ratio increases the range of particle sizes common to both grades decreases.

Typically, abrasive ceramic aggregate according to the present invention containing two grades of abrasive particles comprise from about 10% to about 90% by weight of the larger grade of abrasive particles and from about 90% to about 10% of the smaller grade of abrasive particles. In some embodiments, the agglomerate abrasive grain according to the present invention comprise from about 25% to about 75% by weight of the larger grade of abrasive particles and from about 25% to about 75% by weight of the smaller grade of abrasive particles. In still other embodiments, the larger grade of abrasive particle is about 60% by weight and the smaller grade of abrasive particles is about 40% by weight. Abrasive ceramic aggregates according to the present invention comprising more than two grades of abrasive particles typically comprise from about 10% to 50% by weight of the larger grade of abrasive particles and from about 50% to about 90% by weight for all smaller grades of abrasive particles. If there are two or more of the smaller abrasive particle grades, these grades may be present in equal or unequal amounts.

Abrasive grains may also have a surface coating. A surface coating can improve the adhesion between the abrasive grain and the ceramic binder material in the abrasive ceramic aggregate particle and/or can alter the abrading characteristics of the abrasive grain. Such surface coatings are described in U.S. Pat. Nos. 5,011,508; 1,910,444; 3,041,156; 5,009,675; 4,997,461; 5,213,591; and 5,042,991 the disclosures of which are incorporated herein by reference. An abrasive grain may also contain a coupling agent on its surface, such as a silane coupling agent. Coupling agents tend to enhance the adhesion between a solid surface, such as, for example, abrasive grains and curable binder precursor. Examples of coupling agents suitable for this invention include organo-silanes, zircoaluminates, and titanates.

As used in the present invention, abrasive grains typically have an average particle size ranging from about 125 to 1500 micrometers.

Useful abrasive grains typically have a Mohs hardness of at least about 7, preferably of at least about 8 and more preferably above 9. The expression "Mohs hardness" means a value corresponding to a number on the "Mohs scale." "Mohs scale" is defined as a scale of hardness for minerals (see Lafferty, Peter, The Dictionary of Science, p. 386 (1993) or Handbook of Chemistry and Physics, p. F-22 (1975)).

Useful fillers tend to affect properties of the ceramic aggregate particles, such as, for example, hardness, porosity level, wear behavior, etc. Examples of useful filler materials include metal carbonates (such as calcium carbonate, chalk, calcite, marl, travertine, marble, limestone, calcium magnesium carbonate, sodium carbonate, magnesium carbonate), pore forming additives (such as wood pulp, wood flour, glass bubbles, glass beads, organic bubbles, organic beads), silica (such as amorphous silica, quartz, glass beads, glass powder, glass bubbles, and glass fibers), silicates (such as talc, clays (montmorillonite), feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), aluminum trihydrate, metal oxides (such as calcium oxide (lime), aluminum oxide, titanium dioxide), and metal sulfites (such as calcium sulfite), greystone, marble, gypsum, $Na_2SiF_6$, cryolite, vermiculite, and combinations of these materials.

"Grinding aid" refers to materials capable of improving the abrasion performance of an abrasive article upon a metal workpiece when incorporated into an abrasive coating. In general, the addition of a grinding aid increases the useful life of the abrasive product. Specifically, grinding aids tend to increase the grinding efficiency or cut rate (i.e., the weight of a metal workpiece removed per weight of abrasive article lost) of an abrasive article upon a metal workpiece. Although not wanting to be bound by theory, it is believed that a grinding aid(s) will (a) decrease the friction between the abrasive material and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decrease the grinding forces. Some examples of useful grinding aids include halide salts, metals, and their alloys. The inorganic halide compounds will typically break down during abrading and release a halogen acid or a gaseous halide compound. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include tin, lead, bismuth, cobalt, antimony, cadmium, iron, and titanium. Other useful grinding aids include sulfur, graphite, and metallic sulfides. The above-mentioned examples of grinding aids is meant to be a representative showing of grinding aids, and it is not meant to encompass all grinding aids.

Useful fibers tend to affect properties of the ceramic aggregate particles, such as, for example, abrasive properties, electronic properties, reinforcement properties, etc. Exemplary useful fibers include inorganic oxide, nitride, and carbide compositions. Inorganic fibers may be crystalline or non-crystalline, and may be derived from natural minerals or synthesized from solution, sol, or polymer precursors. Fibers may be formed by blowing or drawing from a melt, as in the case of conventional glass fibers, or may be fabricated into continuous forms by dry or wet spinning processes as in the case of some polycrystalline ceramic fibers. Continuous fibers may be further processed into short, discontinuous lengths and used as solid particulates.

Useful electronically active particulates include conductive particulates (e.g., graphite particulates, carbon black particulates, or other anti-static agents), ferroelectric particulates (e.g., lead-zirconate-titanate, barium-titanate, and lead-lanthanum-zirconate-titanate), magnetic particulates (e.g., magnetite, bariumhexaferrite), superconductive particulates, or combinations of these materials.

Useful pigment particulates are typically inorganic materials that tend to affect ceramic aggregate particle properties, such as, for example, color, whiteness, or opacity. Exemplary useful pigments include iron oxides, cobalt oxide, manganese dioxide, titanium oxides. Other exemplary useful pigments include compounds of rare-earth, nickel, cadmium, chromium, and copper elements.

Method of Making

One embodiment of a method for making the ceramic aggregate particles of the present invention comprises forming a composition comprising curable binder precursor material, ceramic binder precursor material, and a plurality of solid particulates into ceramic aggregate precursor particles. This method of forming ceramic aggregate particles is described in Applicant's U.S. Ser. No. 09/972,316 now U.S. Pat. No. 6,620,214, (filed on the same date as this application and incorporated herein). One method of forming such particles comprises passing the composition through at least one orifice in a perforated substrate, separating the ceramic aggregate precursor particles from the perforated substrate, and at least partially curing the ceramic aggregate precursor particles.

As used herein, the expression "curable binder precursor material" refers to any material that is deformable or can be made to be deformed by heat or pressure or both and can be at least partially cured to provide material, such as, for example, ceramic aggregate precursor particles, that are handleable and collectable. As used herein with respect to curable binder precursor material, the expression "at least partially cured" means "part" or "all" of the curable binder precursor material has been cured to such a degree that it is handleable and collectable. The expression "at least partially cured" does not mean that part or all of the curable binder precursor is always fully cured, but that it is sufficiently cured, after being at least partially cured, to be handleable and collectable.

As used herein, the expression "handleable and collectable" refers to material that will not substantially flow or experience a substantial change in shape. Ceramic aggregate precursor particles and ceramic aggregate particles that are handleable and collectable tend to remain intact if subjected to an applied force that tends to strain or deform a body. Ceramic aggregate precursor particles and ceramic aggregate particles that are not handleable and collectable tend not to remain intact if subjected to an applied force that tends to strain or deform a body.

As used herein, the expression "ceramic binder precursor material" refers to particulate additives which, when heated to a temperature sufficient to burn out organic materials present in the ceramic aggregate precursor particle, may subsequently bond together to form a rigid ceramic phase bonding the ceramic aggregate particle together and to provide a ceramic aggregate particle. Ceramic binder precursor material may include crystalline or non-crystalline ceramic material. Hereinafter, "ceramic aggregate precursor particle" means the ceramic binder precursor material has not yet bonded together sufficiently to provide a particle that is handleable and collectable. Hereinafter, "ceramic aggregate particle" means the ceramic binder precursor material has sufficiently bonded together to provide a particle that is handleable and collectable. Typically, methods according to the present invention provide at least a portion of the ceramic aggregate particles having an aspect ratio greater than one.

Hereinafter, "essentially free of solvents" means the composition used to make ceramic aggregate precursor particles contains less than 10% solvent.

Curable Binder Precursor

Curable binder precursor can be cured by radiation energy or thermal energy. Typically, radiation curable binder precursor material comprises at least one of epoxy resin, acrylated urethane resin, acrylated epoxy resin, ethylenically unsaturated resin, aminoplast resin having at least one pendant unsaturated carbonyl group, isocyanurate derivatives having at least one pendant acrylate group, isocyanate derivatives having at least one pendant acrylate group, or combinations thereof. Other useful radiation curable binder precursor material includes vinyl ethers.

Epoxies have an oxirane ring and are polymerized by the ring opening via a cationic mechanism. Useful epoxy resins include monomeric epoxy resins and polymeric epoxy resins. These resins can vary greatly in the nature of their backbones and substituent groups. For example, the backbone may be of any type normally associated with epoxy resins and substituent groups thereon can be any group free of an active hydrogen atom that is reactive with an oxirane ring at room temperature. Representative examples of substituent groups for epoxy resins include halogens, ester groups, ether groups, sulfonate groups, siloxane groups, nitro groups, and phosphate groups. Examples of some epoxy resins useful in this invention include 2,2-bis[4-(2,3-epoxypropoxy)phenyl]propane (diglycidyl ether of bisphenol A) and materials under the trade designation "EPON 828", "EPON 1004" and "EPON 1001F", commercially available from Shell Chemical Co., Houston, Tex., "DER-331", "DER-332" and "DER-334", commercially available from Dow Chemical Co., Freeport, Tex. Other suitable epoxy resins include glycidyl ethers of phenol formaldehyde novolac (e.g., "DEN-431" and "DEN-428", commercially available from Dow Chemical Co.). The epoxy resins used in the invention can polymerize via a cationic mechanism with the addition of appropriate photoinitiator(s). These resins are further described in U.S. Pat. Nos. 4,318,766 and 4,751,138, which are incorporated by reference.

Exemplary acrylated urethane resin includes a diacrylate ester of a hydroxy terminated isocyanate extended polyester or polyether. Examples of commercially available acrylated urethane resin include "UVITHANE 782" and "UVITHANE 783," both available from Morton Thiokol Chemical, Moss Point, Miss., and "CMD 6600", "CMD 8400", and "CMD 8805", all available from Radcure Specialties, Pampa, Tex.

Exemplary acrylated epoxy resin includes a diacrylate ester of epoxy resin, such as the diacrylate ester of an epoxy resin such as bisphenol. Examples of commercially available acrylated epoxy resin include "CMD 3500", "CMD 3600", and "CMD 3700", available from Radcure Specialties.

Exemplary ethylenically unsaturated resin includes both monomeric and polymeric compounds that contain atoms of carbon, hydrogen and oxygen, and optionally, nitrogen or the halogens. Oxygen atoms, nitrogen atoms, or both, are generally present in ether, ester, urethane, amide, and urea groups. Ethylenically unsaturated resin typically has a molecular weight of less than about 4,000 and is in one embodiment an ester resulting from the reaction of compounds containing aliphatic monohydroxy groups or aliphatic polyhydroxy groups and unsaturated carboxylic acids, such as acrylic acid, methacrylic acid, itaconic acid, crotonic acid, isocrotonic acid, maleic acid, and the like.

Representative examples of other useful acrylates include methyl methacrylate, ethyl methacrylate, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, and pentaerythritol tetraacrylate. Other useful ethylenically unsaturated resins include monoallyl, polyallyl, and polymethylallyl esters and amides of carboxylic acids, such as diallyl phthalate, diallyl adipate, and N,N-diallyladipamide. Still, other useful ethylenically unsaturated resins include styrene, divinyl benzene, and vinyl toluene. Other useful nitrogen-containing, ethylenically unsaturated resins include tris(2-acryloyl-oxyethyl) isocyanurate, 1,3,5-tri(2-methyacryloxyethyl)-s-triazine, acrylamide, methylacrylamide, N-methylacrylamide, N,N-dimethylacrylamide, N-vinylpyrrolidone, and N-vinylpiperidone.

Some useful aminoplast resins can be monomeric or oligomeric. Typically, the aminoplast resins have at least one pendant α,β-unsaturated carbonyl group per molecule. These α,β-unsaturated carbonyl groups can be acrylate, methacrylate, or acrylamide groups. Examples of such resins include N-hydroxymethyl-acrylamide, N,N'-oxydimethylenebisacrylamide, ortho and para acrylamidomethylated phenol, acrylamidomethylated phenolic novolac, and combinations thereof. These materials are further described in U.S. Pat. Nos. 4,903,440 and 5,236,472, which are incorporated by reference.

Useful isocyanurate derivatives having at least one pendant acrylate group and isocyanate derivatives having at least one pendant acrylate group are further described in U.S. Pat. No. 4,652,274, which is incorporated by reference. One such isocyanurate material is a triacrylate of tris(2-hydroxyethyl)isocyanurate.

Examples of vinyl ethers suitable for this invention include vinyl ether functionalized urethane oligomers, commercially available from Allied Signal, Morristown, N.J., under the trade designations "VE 4010", "VE 4015", "VE 2010", "VE 2020", and "VE 4020".

Ceramic Binder Precursor Material

Ceramic binder precursor includes crystalline and/or non-crystalline ceramic materials. Typically, ceramic binder precursor material is selected from the group consisting of glass powder, frits, clay, fluxing minerals, silica sols, sinterable ceramic powders or combinations thereof. After heating, the ceramic binder precursor material forms ceramic binder. Typically, utilizing a method of the present invention, the ceramic binder bonds solid particulates, such as abrasive grains, together to form ceramic aggregate particles.

Useful glass powder may include silicate or non-silicate based glass powder. Silicate based glass powder may be single-phase or multi-component systems. In one embodiment, a single-phase glass powder includes vitreous silica. Multi-component silicate glass powder typically contains modifiers or intermediates, such as, for example, metal oxides. Useful examples of multi-component silicate glass powder include alkali silicates, containing alkali metal oxides; soda-lime glasses, containing alkali and alkaline earth metal oxides, plus, typically, small amounts of alumina and other miscellaneous oxides; borosilicate glasses; aluminosilicate glasses; lead glasses. Useful non-silicate based glass powder may include vitreous metal and non-metal oxide systems, including, but not limited to, $P_2O_5$, $GeO_2$, $B_2O_3$, $Al_2O_3$, $Li_2O$, $Na_2O$, $K_2O$, BeO, MgO, CaO, BaO, PbO, ZnO and FeO. Other useful examples of non-silicate glasses include borate glasses, such as Lindemann glasses ($Li_2O.BeO.B_2O_3$); phosphate glasses; calcium aluminate glasses; calcium germanate glasses. By definition, glass-ceramics are at least 50% crystalline. Examples of crystalline phases include β-quartz; β-quartz solid solution; β-spodumene solid solution, $Li_2O.Al_2O_3.(SiO_2)_{4-10}$; lithium metasilicate-lithium disilicate, $Li_2O.SiO_2$—$Li_2O.2SiO_2$; β-spodumene solid solution-mullite, $Li_2O.Al_2O_3.(SiO_2)_{4-10}$— $3Al_2O_3.2SiO_2$; α-quartz solid solution-spinel-enstatite, $SiO_2$—$MgO.Al_2O_3$—$MgO.SiO_2$. Titanate or zirconates are typically employed as the primary crystalline nuclei.

Exemplary frit binder precursors include feldspar, borax, quartz, soda ash, red lead, zinc oxide, whiting, antimony trioxide, titanium dioxide, sodium silicofluoride, flint, cryolite, boric acid and combinations thereof. One method of making frits comprises heating a powder of a given frit material until the powder fuses together, allowing the fused powder to cool, and then crushing and screening the fused powder to provide a very fine powder to be used as a frit binder precursor. In one embodiment, a frit binder precursor comprises, by weight, 63% silica, 12% alumina, 1.2% calcium oxide, 6.3% sodium oxide, 7.5% potassium oxide and 10% boron oxide. The temperature at which a powder is fused together is dependant upon the powder chemistry. In one embodiment, the temperature can be in the range from about 800° C. (1472° F.) to about 1800° C. (3272° F.). In another embodiment, the temperature can be in the range from about 900° C. (1652° F.) to about 1400° C. (2552° F.). Frits may be combined with other ceramic binder precursors to provide a ceramic binder precursor to be used in the present invention. In one embodiment, the ceramic binder precursor may comprise from about 1 to 100% frit; in another embodiment, from about 20 to 100% frit. Further details concerning frit binder precursors may be found in U.S. Pat. No. 4,898,597 (Hay), the disclosure of which is incorporated herein by reference.

Useful clay may include crystalline hydrate silicates of aluminum, iron, and magnesium compounds. Examples include, but are not limited to, kaolin, ball clay, fire clay, bentonite, Fuller's earth, activated clays, calcined clays, colloidal clays.

Useful fluxing minerals may include materials that react at low temperatures with other materials present to form a glass phase, thus lowering the required firing temperature of a ceramic binder precursor. In one embodiment, useful fluxing minerals may include alkali or alkaline earth oxides, boric oxide, or lead oxide. Useful examples of fluxing minerals include potassium feldspar, sodium feldspar, calcium feldspar, nepheline syenite, talc, soda ash, borax, and lead oxides.

Silica sols typically comprise silica particles. As used herein, the term "sol" means a colloidal dispersion of substantially non-aggregated, inorganic oxide particles (e.g., silica particles) in a liquid medium (e.g., aqueous or non-aqueous). Exemplary silica sols in aqueous solutions include "LUDOX" (obtained from E.I. DuPont de Nemours and Co., Wilmington, Del. under the trade designation "LUDOX"), "NYACOL" (obtained from Nyacol Co., Ashland, Mass. under the trade designation "NYACOL"), and "NALCO" (obtained from Nalco Chemical Co., Oak Brook, Ill. under the trade designation "NALCO"). Exemplary silica sols in non-aqueous solutions (also called silica organosols) include "NALCO 1057" (a silica sol in 2-propoxyethanol) (obtained from Nalco Chemical Co., Oak Brook, Ill. under the trade designation "NALCO 1057"), "MA-ST, IP-ST" and "EG-ST" (obtained from Nissan Chemical Ind., Tokyo, Japan under the trade designation "MA-ST, IP-ST" and "EG-ST"). In one embodiment the colloidal silica particles have an average particle diameter in the range from about 5 to about 100 nanometers. In another embodiment, the particles have an average particle diameter in the range from about 10 to about 50 nanometers. Additional exemplary silica sols are described in U.S. Pat. No. 5,611,829 (Monroe et al.) and U.S. Pat. No. 5,645,619 (Erickson et al.), the disclosures of which are incorporated herein by reference. In another aspect, the pH of a sol may be adjusted to affect dispersion stability of the sol. In one embodiment, the pH may be alkaline (e.g., pH in the range from about 8 to about 11). In another embodiment, the pH may be acidic (e.g., pH in the range from about 2 to about 6).

Useful sinterable ceramic powder may include crystalline oxides, non-crystalline oxides, carbides, nitrides, silicides, borides, phosphides, sulfides, tellurides, and selenides. Useful examples of sinterable ceramic powders include aluminum oxide, silicon oxide, titanium oxide, zirconium oxide, alumina-zirconia, silicon carbide, titanium carbide, titanium boride, aluminum nitride, silicon nitride, ferrites, iron sulfide.

In forming a composition comprising curable binder precursor material, ceramic binder precursor material, and a plurality of solid particulates, a variety of weight percentages for each component may be useful. Exemplary methods according to the present invention may use relatively higher weight percentages of solid particulates (e.g., abrasive grains) and ceramic binder precursor as compared to curable binder precursor. Reducing the amount of curable binder precursor may be advantageous because the curable binder precursor is "burned out" during the heating step which may be considered wasteful. In one useful embodiment, the curable binder precursor material may be in the range from about 5% to about 22% by weight; in another useful embodiment, in the range from about 7% to about 13% by weight; and in another useful embodiment, in the range from about 8% to about 10% by weight. In one useful embodiment, the ceramic binder precursor material may be in the range from about 11% to about 63% by weight; in another useful embodiment, in the range from about 22% to about 37% by weight; and in another useful embodiment, in the range from about 26% to about 31% by weight. In one useful embodiment, the plurality of solid particulates may be in the range from about 29% to about 81% by weight; in another useful embodiment, in the range from about 52% to about 70% by weight; and in another useful embodiment, the curable binder precursor material may be in the range from about 5% to about 22% by weight; in another useful embodiment, in the range from about 7% to about 13% by weight; and in another useful embodiment, in the range from about 8% to about 10% by weight. In one useful embodiment, the ceramic binder precursor material may be in the range from about 11% to about 63% by weight; in another useful embodiment, in the range from about 22% to about 37% by weight; and in another useful embodiment, in the range from about 26% to about 31% by weight. In one useful embodiment, the plurality of solid particulates may be in the range from about 29% to about 81% by weight; in another useful embodiment, in the range from about 52% to about 70% by weight; and in another useful embodiment in the range from about 60% to about 66% by weight. Useful compositions may be organic based, aqueous based, or essentially free of solvent. In one embodiment, the composition may be less than 10% solvent. In another embodiment, the composition may be less than 0.5% solvent. And in another embodiment, the composition may be less than 0.1% solvent.

Initiator

Optionally, the curable composition may further comprise an initiator selected from the group consisting of photoinitiator, thermal initiator, and combinations thereof. As used in the present invention, a thermal initiator may be used when thermal energy is used in the partial curing step, and photoinitiators may be used when ultraviolet and/or visible light is used in the partial curing step. The requirement of an initiator may depend on the type of the curable binder precursor used and/or the type of energy (e.g., electron beam or ultraviolet light). For example, phenolic-based curable binder precursors typically do not require the addition of an initiator when thermally cured. However, acrylate-based curable binder precursors typically do require the addition of an initiator when thermally cured. As another example, initiators typically are not required when electron beam energy is used during the partial curing step. However, if ultraviolet or visible light is utilized, a photoinitiator is typically included in the composition.

Upon being exposed to thermal energy, a thermal initiator generates a free radical source. The free radical source then initiates the polymerization of the curable binder precursor. Exemplary thermal initiators include organic peroxides (e.g. benzoil peroxide), azo compounds, quinones, nitroso compounds, acyl halides, hydrazones, mercapto compounds, pyrylium compounds, imidazoles, chlorotriazines, benzoin, benzoin alkyl ethers, diketones, phenones, and mixtures thereof. Azo compounds suitable as thermal initiators in the present invention may be obtained under the trade designations VAZO 52, VAZO 64 and VAZO 67 from E.I. duPont deNemours and Co., Wilmington, Del.

Upon being exposed to ultraviolet or visible light, the photoinitiator generates a free radical source or a cationic source. This free radical or cationic source then initiates the polymerization of the curable binder precursor.

Exemplary photoinitiators that generate a free radical source when exposed to ultraviolet light include, but are not limited to, those selected from the group consisting of organic peroxides (e.g., benzoil peroxide), azo compounds, quinones, benzophenones, nitroso compounds, acyl halides, hydrozones, mercapto compounds, pyrylium compounds, triacrylimidazoles, bisimidazoles, chloroalkytriazines, benzoin ethers, benzil ketals, thioxanthones, and acetophenone derivatives, and mixtures thereof. Examples of photoinitiators that generate a free radical source when exposed to visible radiation are further described in U.S. Pat. No. 4,735,632, the disclosure of which is incorporated herein by reference.

Cationic photoinitiators generate an acid source to initiate the polymerization of an epoxy resin or a urethane. Exemplary cationic photoinitiators include a salt having an onium cation and a halogen-containing complex anion of a metal or metalloid. Other useful cationic photoinitiators include a salt having an organometallic complex cation and a halogen-containing complex anion of a metal or metalloid. These photoinitiators are further described in U.S. Pat. No. 4,751,138, the disclosure of which is incorporated herein by reference. Another example is an organometallic salt and an onium salt described in U.S. Pat. No. 4,985,340; the disclosure of which is incorporated herein by reference. Still other cationic photoinitiators include an ionic salt of an organometallic complex in which the metal is selected from the elements of Periodic Groups IVB, VB, VIB, VIIB, and VIIIB. These photoinitiators are further described in U.S. Pat. No. 5,089,536, the disclosure of which is incorporated herein by reference.

Ultraviolet-activated photoinitiators suitable for the present invention may be obtained under the trade designations "IRGACURE 651", "IRGACURE 184", "IRGACURE 369" and "IRGACURE 819" from Ciba Geigy Company, Winterville, Miss., "Lucirin TPO-L", from BASF Corp., Livingston, N.J., and "DAROCUR 1173" from Merck & Co., Rahway, N.J.

In one embodiment, the total amount of initiator (either photoinitiator, thermal initiator, or combinations thereof) may be in the range from 0.1 to 10 percent by weight of the curable binder precursor; in another embodiment, from about 1 to about 5 percent by weight of the curable binder precursor. If both photoinitiator and thermal initiator are used, the ratio of photoinitiator to thermal initiator is between about 3.5:1 to about 0.5:1.

In another aspect, if ultraviolet or visible light energy is used in the at least partially curing step, the composition may also include a photosensitizer. Photosensitizer expands the wavelength at which the initiator or monomer forms free radicals. Exemplary photosensitizers include compounds having carbonyl groups or tertiary amino groups and mixtures thereof. Useful examples of compounds having carbonyl groups are benzophenone, acetophenone, benzil, benzaldehyde, o-chlorobenzaldehyde, xanthone, thioxanthone, 9,10-anthraquinone, and other aromatic ketones. Useful examples of tertiary amines are methyldiethanolamine, ethyldiethanolamine, triethanolamine, phenylmethylethanolamine, and dimethylaminoethylbenzoate. In one embodiment, the amount of photosensitizer in the composition may be in the range from about 0.01 to 10% by weight of the curable binder precursor. In another embodiment, the amount of photosensitizer in the composition may be in the range from about 0.25 to 4% by weight of the curable binder precursor.

Modifying Additives

Modifying additives are typically included in the curable composition to modify the processing characteristics of the composition (e.g., change viscosity, etc.). Useful examples of modifying additives include coupling agents, wetting agents, flowing agents, surfactants and combinations thereof. Many additives tend to decompose during the heating step.

Coupling agents tend to enhance the adhesion between a solid surface (e.g., abrasive grains) and curable binder precursor. Useful examples of coupling agents suitable for this invention include organo-silanes, zircoaluminates, and titanates. An abrasive grain may also contain a coupling agent on its surface, such as a silane coupling agent.

Wetting agents, or surfactants, tend to control rheology of the composition during processing. In general, any type of wetting agent, i.e., anionic, cationic, nonionic, amphoteric, zwitterionic, etc., can be employed in the composition. Useful examples of wetting agents include INTERWET 33 from Chemie America Interstab Chemicals, New Brunswick, N.J.; FLUORAD from 3M Co. St. Paul, Minn. or AEROSOL OT from Rohm Haas, Philadelphia, Pa.

Flowing agents tend to prevent "caking" of powders during processing. For example, a flowing agent may be used in the present invention to prevent ceramic binder precursor from caking during the forming step. Useful examples of flowing agents include condensates of ethylene oxide and unsaturated fatty acids.

Ceramic Aggregate Particles

In one embodiment of the present invention, a composition is formed into ceramic aggregate precursor particles by passing the composition through an orifice. For example, FIG. 1 illustrates a ceramic aggregate particle of the present invention. The ceramic aggregate particle 80 itself comprises a plurality of solid particulates 84 coated by and embedded in a ceramic binder 82. Optionally, there may exist space 86 void of ceramic binder 82 that is accessible to the outer surface of the particle and suitable to permit fluid penetration. Such fluid penetration allows the aggregate particle to possess "surface connected porosity". In one embodiment of the present invention, ceramic aggregate particles have an aspect ratio greater than one, and typically in the range from about one to about 30. As used herein, the expression "aspect ratio" is the longest dimension of the particle (L) divided by the shortest dimension of the particle (W). In another embodiment, the particles have an aspect ratio in the range from about one to about 10. And in another embodiment, the particles have an aspect ratio in the range from about one to about 3.

In another aspect, ceramic aggregate particles made according to the present invention may have different sizes (e.g., ceramic aggregate particles with different diameters). For example, in one embodiment, a composition that is passed through a perforated substrate with circular orifice(s) tends to form ceramic aggregate precursor particles with approximately circular cross-sections of about the same diameter as the orifice(s). In one embodiment of the present invention, ceramic aggregate particles may have a diameter in the range from about 25 micrometers (one mil) to about 12,700 micrometers (500 mils). In another embodiment, ceramic aggregate particles may have a diameter in the range from about 381 micrometers (15 mils) to about 6350 micrometers (250 mils) in diameter.

One of the features of the present invention is that the aggregate particles formed as described above have substantially uniform cross-sectional dimensions, as measured along a designated axis. By "substantially uniform" it is meant that the dimension does not vary by more than about 20 percent, typically no more than about 10 percent.

In another aspect, ceramic aggregate particles made according to the present invention may have different shapes. For example, the particles may have cross-sectional shapes that are approximately circular or polygonal (e.g., square, triangular, etc.). Particles having an aspect ratio greater than one are typically rod-shaped. In another embodiment, the particles may be crushed to have random shapes.

An exemplary perforated substrate may be material with one or more orifices that has sufficient strength to allow a composition to be passed through the orifice(s) without rupturing the perforated substrate. In general, perforated substrates may include, for example, mesh screens as described, for example, in U.S. Pat. No. 5,090,968 the disclosure of which is incorporated herein by reference, film dies, spinneret dies, sieve webs as described, for example, in U.S. Pat. No. 4,393,021 or screens as described, for example, in U.S. Pat. No. 4,773,599 the disclosures of which are incorporated herein by reference. In one embodiment of the present invention, perforated substrates include conical screens with circular orifice(s) in the range from about 25 micrometers (one mil) to about 12,700 micrometers (500 mils) in diameter. In another embodiment, perforated substrates include conical screens with circular orifice(s) in the range from about 381 micrometers (15 mils) to about 6350 micrometers (250 mils) in diameter.

Figure 3:
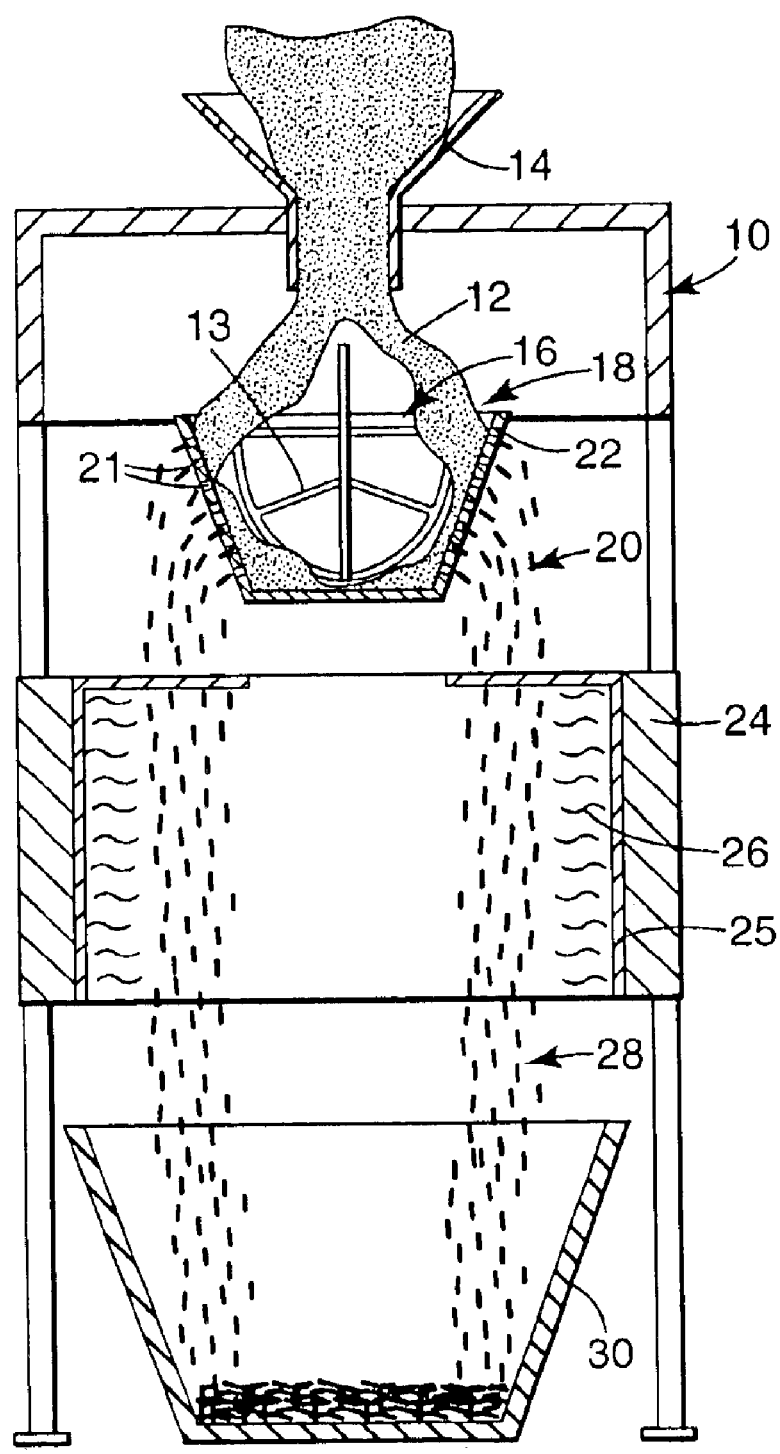
FIG. 3 is a schematic side view illustrating a device for making the plurality of ceramic aggregate particles of the present invention.
Figure 4:
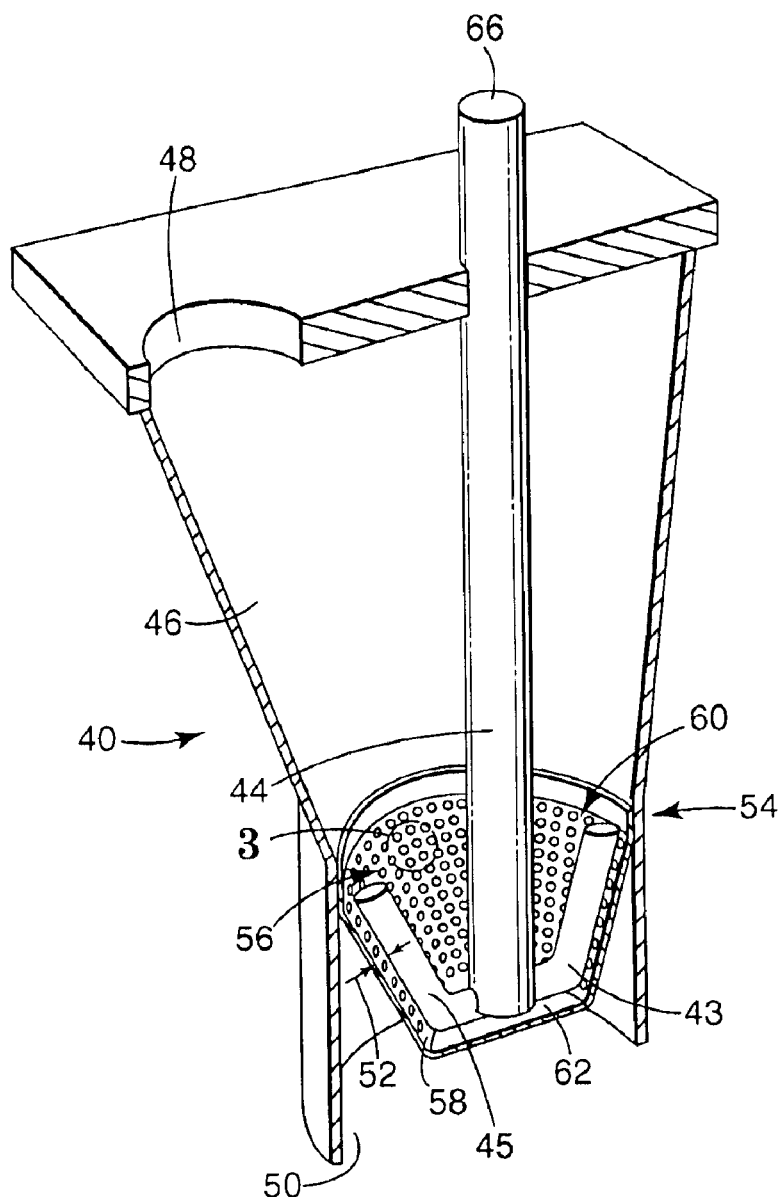
FIG. 4 is a perspective view of a portion of a device for making the plurality of ceramic aggregate particles of the present invention, with a front portion of the device cut away to expose a portion of the interior of the device.

The forming device 18 in FIG. 3 may be any material forming apparatus such as, for example, an extruder, milling/size reducing machine, pellitizer or pan agglomerater. FIG. 4 illustrates a preferred forming device 40 which is a size-reducing machine, available from Y-Tron Quadro (U.K.) Limited, Chesham, United Kingdom, under the trade designation "QUADRO COMIL." Forming device 40 has impeller 43 mounted on a rotatable shaft 44. Shaft 44 and impeller 43 are located in channel 46 having input 48 and output 50. Impeller 43 is shaped and mounted so that gap 52 exists between an outer edge 45 of said impeller 43 and a tapered aperatured wall 58 of screen 56 and gap 52 is substantially constant as the impeller 43 rotates about shaft 44.

Generally, the cross sectional shape of impeller 43 may be, for example, or angular flats. Typically, impeller 43 shapes used in the present invention are round. In one embodiment, impeller 43 shapes are arrow-head shaped.

Gap 52 width may range, for example, from 25 micometers (1 mil) to 5080 micometers (200 mils). Typically, gap 52 width ranges from 127 micrometers (5 mils) to 1270 micrometers (50 mils).

Adjusting impeller 43 rotation speed to optimize forming ceramic aggregate precursor particles will be readily apparent to one skilled in the art. Typically, impeller 43 rotation speed is from 50 to 3500 rpm.

Channel 46 also contains a support 54 shaped and positioned to hold screen 56 so that any material passing from input 48 to output 50 passes through screen 56. Screen 56 is formed to have the tapered apertured wall 58 formed into a frusto-conical shape, with a wide end 60 of the screen 56 being open and a narrow end 62 being at least partially closed. In most uses, it is desirable to have the narrow end 62 completely closed. The screen 56 has orifice(s) 64 that are shaped.

Figure 5:
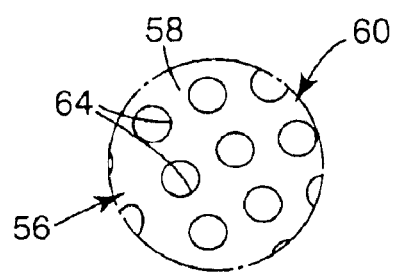
FIG. 5 is a perspective view of a portion of the screen used in the device shown in FIG. 4.

As shown in FIG. 5, screen orifice(s) 64 may be shaped to be curved, circular or polygonal, including, for example, triangles, squares and hexagons. Typically, the shape of screen orifice(s) 64 used in the present invention are circular or square. Preferred shapes for screen orifice(s) 64 are square or circular, ranging in size from 381 micrometers (15 mil) to 6350 micrometers (250 mil) in diameter or across.

As can readily be seen from FIG. 4, end 66 of shaft 44 protrudes from channel 46. A power source (not shown) can easily be attached to end 66 of shaft 44 to cause shaft 44 and attached impeller 43 to rotate relative to screen 56. Typically, the power source is a variable speed electric motor. However, the power source is conventional and many other power sources will be suitable to operate the apparatus 40.

In another aspect, the present invention involves at least partially curing the composition present in the ceramic aggregate precursor particles. In one embodiment, for example as illustrated in FIG. 3, the ceramic aggregate precursor particles become at least partially cured as they fall by gravity through a curing zone 24. As shown in FIG. 3, at least partially curing may provide handleable and collectable ceramic aggregate precursor particles 28, which may be collected in container 30.

The at least partially curing of the ceramic aggregate precursor particles may be caused by an energy source 26. Exemplary energy source(s) 26 include thermal and radiation energy. Typically, a radiation energy source(s) is used. Exemplary sources of radiation energy are electron beam, ultraviolet light, visible light, microwave, laser light and combinations thereof.

In one embodiment, ultraviolet light is used as a radiation energy source 26 and mirrors 25 are used in a curing zone 24 to reflect the ultraviolet waves in a way that intensifies the energy transmitted to the ceramic aggregate precursor particles. Ultraviolet radiation refers to non-particulate radiation having a wavelength within the range of about 4 to about 400 nanometers, preferably in the range of about 250 to about 400 nanometers. In one embodiment, an apparatus used for at least partially radiation curing is one such as that available from Fusion UV Systems, Inc., Gaithersburg, Md., under the trade designation "DRE 410 Q". In one embodiment, the "DRE 410 Q" radiation apparatus is equipped with, for example, two 600 watt "d" fusion lamps that are set on "high" power.

Visible radiation refers to non-particulate radiation having a wavelength within the range of about 400 to about 800 nanometers. In one embodiment, non-particulate radiation having a wavelength in the range of about 400 to about 550 nanometers is used.

In other embodiments, a thermal energy source(s) may be used. Exemplary sources of thermal energy that may be utilized include electrical or combustion heat sources. In another embodiment, infrared radiation may be used as a source of thermal energy.

The amount of radiation energy needed to at least partially cure the ceramic aggregate precursor particles to provide handleable and collectable ceramic aggregate precursor particles may depend upon factors such as, for example, the type of curable binder precursor material, the type of ceramic binder precursor material, residence time in the curing zone, the type of solid particulates and the type of, if any, optional modifying additives.

Optionally, ceramic aggregate precursor particles made according to a method of the present invention may be further at least partially cured using thermal energy, radiation energy, or combinations thereof. Further at least partially curing may provide ceramic aggregate precursor particles with different properties such as, for example, increased rigidity for handling and collecting. Typically, ceramic aggregate particles that are handleable and collectable tend to remain cohesive ceramic aggregate precursor particles through the method steps. Typically, ceramic aggregate particles that are not handleable and collectable tend to break apart if the particles are physically moved at a point during the method steps. In one embodiment, first ceramic aggregate precursor particles are at least partially cured to provide second ceramic aggregate precursor particles comprising curable binder precursor material, ceramic binder precursor material, a plurality of solid particulates, and the product of at least partially curing the first ceramic aggregate precursor particles. The method further comprises at least partially curing the second ceramic aggregate precursor particles that are handleable and collectable.

In one embodiment of the present invention, after at least partially curing the ceramic aggregate precursor particles, the next step involves heating the ceramic aggregate precursor particles to a temperature and for a time sufficient to provide ceramic aggregate particles with desired properties, such as, for example, Total Pore Volume (ml/g), Apparent Particle Volume (ml/g), Volume % Porosity, Apparent Bulk Density (g/cm$^3$), or Crush Strength (lb). Total Pore Volume and Apparent Particle Volume are measured by mercury intrusion porosimetry analysis. Mercury intrusion porosimetry analysis is described further in Examples 9–14. Total Pore Volume is the mass-normalized total volume of open space within the ceramic aggregate particle that is connected to the outer surface of the particle, i.e., surface connected porosity, that allows penetration of mercury, due to capillary action, into the ceramic aggregate particle. Mercury intrusion porosimetry measures penetration of mercury into particles with pore diameters in the range from about 0.07 micrometers to about 900 micrometers. Typically, the aggregate particles of the invention have Volume Percent Porosity of up to about 25 percent. Volume Percent Porosity is calculated as follows: (Total Pore Volume/Apparent Particle Volume) x·100. Apparent Particle Volume is the volume of mercury displaced by the ceramic aggregate particle. Apparent Bulk Density is the ratio of the ceramic aggregate particle mass to Apparent Particle Volume. Crush Strength is the average force required to cause a particle to break under a compressive load and is described further in Test Procedure #2. Exemplary values produced by methods of the present invention are discussed below.

In one embodiment, heating includes the following two-step firing process. The two steps of the firing process are usually performed at separate times, but could be completed sequentially at the same time in one firing furnace cycle. In one embodiment, the first (i.e., pre-firing) step involves heating the ceramic aggregate precursor particles from room temperature to a final temperature in the range from about 500° C. to about 650° C. at a slow rate, typically 2° C. per minute and exposing the particles to the final temperature for about 1 to about 4 hours typically, in order to remove cured and/or uncured material, such as, for example, acrylate resin, and to cause the ceramic binder precursor material to sufficiently bond together to provide handleable and collectable particles. Typically, as heating during the first step progresses, ceramic aggregate precursor particle Crush Strength decreases to a minimum. This minimum typically occurs upon complete pyrolysis of cured and/or uncured material because the pyrolysis of any cured and/or uncured material leaves spatial voids in the ceramic aggregate precursor particles and the ceramic binder precursor material typically has not sufficiently bonded together to provide handleable and collectable particles. However, as heating continues towards the final temperature, the ceramic binder precursor material typically starts to sufficiently bond together to cause the particle Crush Strength to increase and to provide handleable and collectable particles. Because the particles are typically not handleable and collectable upon complete pyrolysis, a static bed is typically used during the first step to minimize applied forces to the particles so that the particles remain intact. Examples of firing kilns suitable for static bed firing in the first step include shuttle kilns, roller hearth kilns, pusher plate kilns, and belt furnace kilns. In one embodiment a slow rate of heating, for example 2° C. per minute, the ceramic aggregate precursor particles during the first step is performed to control the rate of pyrolysis of cured and/or uncured material. Typically, relatively fast heating rates tend to cause cured and/or uncured material to decompose into gas(es) at a rate which most likely destroys the ceramic aggregate precursor particles. Typically, heating in the pre-firing step is in an oxidizing atmosphere (e.g., air) to aid in complete pyrolysis of any cured and/or uncured material, such as, for example, acrylate resin. It is preferred that pre-firing temperatures and heating rates are selected to ensure that all cured and/or uncured material is removed from the precursor ceramic aggregate particles at completion of the pre-firing step.

Typically, in the second firing step, pre-fired particles containing no residual cured and/or uncured material are heated to a final temperature in the range from about 650° C. to about 1500° C. at any desired heating rate. Again, it is preferred that no residual cured and/or uncured material is present in the pre-fired particles since evolution of gases from thermal decomposition of the materials may cause particle fracture, thus interfering with desired particle shape uniformity. Typically, the particles are exposed to the final temperature for one to four hours in order to cause partial or complete densification of the ceramic binder precursor material. As used in the present invention, "densification" means the partial or complete elimination of open space within the ceramic aggregate particle to provide ceramic aggregate particles with increased particle density (i.e., decreased particle volume per unit particle mass). In one embodiment, heating during the second firing step may occur in a static bed or non-static bed because pre-fired particles are handleable and collectable and remain intact if subjected to an applied force that tends to strain or deform a body. Examples of non-static beds include rotary kiln or fluidized bed firing techniques.

The final firing temperature and the exposure time of the particles to the final firing temperature affect Total Pore Volume (ml/g), Volume % Porosity, Apparent Bulk Density (g/cm$^3$), and Crush Strength (lb). Both Total Pore Volume and Volume % Porosity of ceramic aggregate particles tends to decrease as the final firing temperature increases and/or as the exposure time of the ceramic aggregate particles to the final firing temperature increases. In one embodiment, Total Pore Volume may be in the range from about 0.01 ml/g to about 0.05 ml/g. In another embodiment, Total Pore Volume may be in the range from about 0.002 ml/g to about 0.25 ml/g. In one embodiment, Volume % Porosity may be in the range from about 25% to about 5%. In another embodiment, Volume % Porosity may be in the range from about 40% to about 1%. Apparent Bulk Density tends to increase as the final firing temperature increases and/or as the exposure time of the ceramic aggregate particles to the final firing temperature increases. In one embodiment, Apparent Bulk Density may be in the range from about 2.5 g/cm$^3$ to about 3.0 g/cm$^3$. In another embodiment, Apparent Bulk Density may be in the range from about 2.0 g/cm$^3$ to about 4.0 g/cm$^3$. Crush Strength tends to increase as the final firing temperature increases and/or as the exposure time of the ceramic aggregate particles to the final firing temperature increases. In one embodiment, Crush Strength may be in the range from about 5 lb. (2.3 kg) to about 25 lb. (11.3 kg). In another embodiment, Crush Strength may be in the range from about 2 lb. (0.9 kg) to about 80 lb. (36.3 kg).

Typically, at least partially cured ceramic aggregate precursor particles are at least partially coated with a metal oxide particulate to prevent them from sticking to one another during heating. If firing steps are performed at separate times, the ceramic aggregate precursor particles are typically coated with metal oxide particulate after pre-firing but before the second firing step. In one embodiment, the quantity of metal oxide particulate used to at least partially coat the ceramic aggregate precursor particles is approximately 5%–10% by weight of the ceramic aggregate precursor particles. In one embodiment, metal oxide particulate includes hydrous alumina.

In another embodiment, methods according to the present invention may involve reducing the average size of ceramic aggregate precursor and/or ceramic aggregate particles after at least partially curing and/or heating respectively. Typically, reducing the average particle size is performed using at least one of milling, crushing, or tumbling. In one embodiment, apparatus 40 shown in FIG. 4 may be used to reduce the average size of ceramic aggregate precursor particles and/or ceramic aggregate particles.

Other methods for making embodiments of ceramic aggregate particles according to the present invention by be found, for example, in application having U.S. Ser. No. 09/972,315 now U.S. Pat. No. 6,790,126, filed on the same date as this application and incorporated herein by reference.

The method of forming the aggregates of the invention described above are generally less costly, and require fewer steps and less space and labor than conventional means of making ceramic aggregate particles, such as molding.

Ceramic aggregate particles made according to methods of the present invention can be used in, for example, abrasives, roofing granules, filtration products, hard coatings, shot blast media, tumbling media, brake linings, anti-slip and wear resistant coatings, synthetic bone, dental compositions, retro-reflective sheeting and laminate composite structures. In one embodiment, methods according to the present invention involve combining at least a portion of the cured ceramic aggregate particles with abrasive article binder material and abrasive material to provide an abrasive article. Suitable abrasive articles include coated abrasive articles (including nonwoven abrasive articles) and bonded abrasive articles.

Abrasive ceramic aggregates according to the present invention can be used in conventional abrasive products, such as coated abrasive products, bonded abrasive products (including vitrified, resinoid, and metal bonded grinding wheels, cutoff wheels, mounted points, and honing stones), nonwoven abrasive products, and abrasive brushes. Typically, abrasive products (i.e., abrasive articles) include binder and abrasive particles (which in practicing the present invention includes abrasive aggregates according to the present invention), secured within the abrasive product by the binder. Methods of making such abrasive products and using abrasive products are well known to those skilled in the art. Furthermore, abrasive aggregates according to the present invention can be used in abrasive applications that utilize slurries of abrading compounds (e.g., polishing compounds), milling media, shot blast media, vibratory mill media and the like.

Coated abrasive products generally include a backing, abrasive material, and at least one binder to hold abrasive particles (which in practicing the present invention includes abrasive particles aggregated together in the form of ceramic abrasive aggregate according to the present invention) onto the backing. The backing can be any suitable material, including cloth, polymeric film, fiber, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive product.

Figure 6:
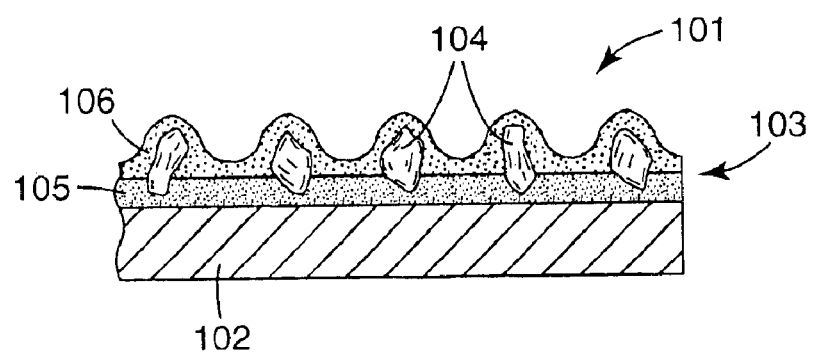
FIG. 6 is a fragmentary cross-sectional schematic view of a coated abrasive article including abrasive ceramic aggregate particles according to the present invention.

An example of a coated abrasive product is depicted in FIG. 6. Referring to this figure, coated abrasive product 101 has a backing (substrate) 102 and abrasive layer 103. Abrasive layer 103 includes abrasive ceramic aggregate according to the present invention 104 secured to a major surface of backing 102 by make coat 105 and size coat 106. In some instances, a supersize coat (not shown) is used.

Bonded abrasive products typically include a shaped mass of abrasive particles (which in practicing the present invention includes abrasive ceramic aggregate), held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive products typically comprise about 3–50% by volume bond material, about 30–90% by volume abrasive material, up to 50% by volume additives (including grinding aids), and up to 70% by volume pores, based on the total volume of the bonded abrasive product. Typically, grinding wheels have at least 10%, 20%, or even more porosity.

Figure 7:
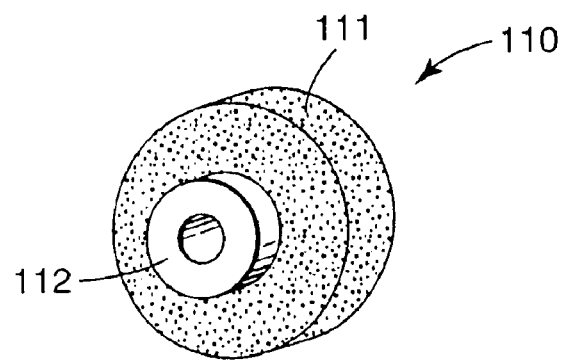
FIG. 7 is a perspective view of a bonded abrasive article including abrasive ceramic aggregate particles according to the present invention.

An exemplary bonded abrasive is a grinding wheel. Referring to FIG. 7, grinding wheel 110 is depicted, which includes abrasive ceramic aggregate according to the present invention 111, molded in a wheel and mounted on hub 112. An advantage that embodiments of abrasive aggregate according to the present invention may offer in a bonded abrasive such as a grinding wheel is room for chip clearance during metal removal. That is, the porosity present in certain embodiments of abrasive aggregates according to the present invention may provide room for chip clearance during metal removal.

Figure 8:
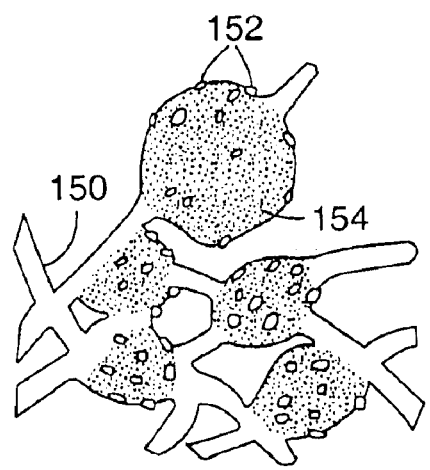
FIG. 8 is an enlarged schematic view of a nonwoven abrasive article including abrasive ceramic aggregate particles according to the present invention.

Nonwoven abrasive products typically include an open porous lofty polymer filament structure having abrasive particles (which in practicing the present invention includes abrasive ceramic aggregates according to the present invention), distributed throughout the structure and adherently bonded therein by an organic binder. Examples of filaments include polyester fibers, polyamide fibers, and polyaramid fibers. In FIG. 8, a schematic depiction, enlarged about 100×, of a typical nonwoven abrasive product is provided. Such a nonwoven abrasive product comprises fibrous mat 150 as a substrate, onto which abrasive ceramic aggregates according to the present invention 152 are adhered by binder 154.

Useful abrasive brushes include those having a plurality of bristles unitary with a backing (see, e.g., U.S. Pat. Nos. 5,427,595 (Pihl et al.), 5,443,906 (Pihl et al.), 5,679,067 (Johnson et al.), and 5,903,951 (Ionta et al.), the disclosure of which is incorporated herein by reference). Such brushes include those made by injection molding a mixture of polymer and abrasive particles (which in practicing the present invention includes abrasive ceramic aggregates according to the present invention).

Suitable organic binders for making abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, acrylated urethane, acrylated epoxies, and combinations thereof. The binder and/or abrasive product may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may be thermally cured, radiation cured or combinations thereof. Additional details on binder chemistry may be found in U.S. Pat. Nos. 4,588,419 (Caul et al.), 4,751,137 (Tumey et al.), and 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. Bonded, vitrified abrasive products may be in the shape of a wheel (including cut off wheels), honing stone, mounted pointed or other conventional bonded abrasive shape. An exemplary vitrified bonded abrasive product is a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in the range from about 700° C. to about 1500° C., usually in the range from about 800° C. to about 1300° C., sometimes in the range from about 900° C. to about 1200° C., or even in the range from about 950° C. to about 1100° C. The actual temperature at which the bond is matured depends, for example, on the particular bond chemistry.

Exemplary vitrified bonding materials include those comprising silica, alumina (e.g., at least 10 percent by weight alumina), and boria (e.g., at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers and grinding aids for this invention have been described earlier herein.

The abrasive products can contain 100% abrasive ceramic aggregate according to the present invention, or blends of such aggregates with other abrasive particles and/or diluent particles. However, at least about 2% by weight, more commonly at least about 5% by weight, and even more commonly about 30–100% by weight, of the abrasive particles in the abrasive products should be abrasive ceramic aggregates according to the present invention. In some instances, the abrasive aggregate according the present invention may be blended with other abrasive particles and/or diluent particles at a ratio between 5 to 75% by weight, about 25 to 75% by weight, about 40 to 60% by weight, or about 50% to 50% by weight (i.e., in equal amounts by weight). Examples of suitable abrasive particles include, but are not limited to, fused aluminum oxide (including white fused alumina, heat treated aluminum oxide and brown aluminum oxide), silicon carbide, silicon nitride, boron carbide, titanium carbide, diamond, cubic boron nitride, garnet, fused alumina-zirconia, sol-gel-derived abrasive particles, and the like. The sol-gel-derived abrasive particles may be seeded or non-seeded. Likewise, the sol-gel-derived abrasive particles may be randomly shaped or have a shape associated with them, such as a triangle. Examples of sol gel abrasive particles include those described above. The abrasive aggregate may have essentially the same size as the diluent particle. Conversely, the abrasive aggregate may be larger in size than the diluent particle. Further, additional useful fused abrasive particles are disclosed, for example, in applications having U.S. Ser. Nos. 09/618,876; 09/618,879; 09/619,106; 09/619,191; 09/619,192; 09/619,215; 09/619,289; 09/619,563; 09/619,729; 09/619,744, and 09/620,262, each filed on Jul. 19, 2000, and 09/772,730, filed Jan. 30, 2001, the disclosure of which is incorporated herein by reference.

Abrasive ceramic aggregates according to the present invention can also be combined with other abrasive agglomerates. The binder of the other abrasive agglomerates may be organic and/or inorganic. Additional details regarding abrasive agglomerates may be found, for example, in U.S. Pat. No. 4,311,489 (Kressner), 4,652,275 (Bloecher et al.), 4,799,939 (Bloecher et al.), 5,549,962 (Holmes et al.), and 5,975,988 (Christianson), the disclosures of which are incorporated herein by reference.

Examples of suitable diluent particles include marble, gypsum, flint, silica, iron oxide, aluminum silicate, glass (including glass bubbles and glass beads), alumina bubbles, alumina beads and diluent agglomerates.

The abrasive particles may be uniformly distributed in the abrasive article or concentrated in selected areas or portions of the abrasive article. For example in a coated abrasive, there may be two layers of abrasive particles/grain. The first layer comprises abrasive particles/grain other than those according to the present invention, and the second (outermost) layer comprises abrasive ceramic aggregate according to the present invention. Likewise in a bonded abrasive, there may be two distinct sections of the grinding wheel. The outermost section may comprise abrasive ceramic aggregates according to the present invention, whereas the innermost section does not. Alternatively, abrasive ceramic aggregates according to the present invention may be uniformly distributed throughout the bonded abrasive article.

Further details regarding coated abrasive products can be found, for example, in U.S. Pat. No. 4,734,104 (Broberg), 4,737,163 (Larkey), 5,203,884 (Buchanan et al.), 5,152,917 (Pieper et al.), 5,378,251 (Culler et al.), 5,417,726 (Stout et al.), 5,436,063 (Follett et al.), 5,496,386 (Broberg et al.), 5,609,706 (Benedict et al.), 5,520,711 (Helmin), 5,954,844 (Law et al.), 5,961,674 (Gagliardi et al.), and 5,975,988 (Christinason), the disclosures of which are incorporated herein by reference. Further details regarding bonded abrasive products can be found, for example, in U.S. Pat. Nos. 4,543,107 (Rue), 4,741,743 (Narayanan et al.), 4,800,685 (Haynes et al.), 4,898,597 (Hay et al.), 4,997,461 (Markhoff-Matheny et al.), 5,038,453 (Narayanan et al.), 5,110,332 (Narayanan et al.), and 5,863,308 (Qi et al.) the disclosures of which are incorporated herein by reference. Further, details regarding vitreous bonded abrasives can be found, for example, in U.S. Pat. Nos. 4,543,107 (Rue), 4,898,597 (Hay), 4,997,461 (Markhoff-Matheny et al.), 5,094,672 (Giles et al.), 5,118,326 (Sheldon et al.), 5,131,926 (Sheldon et al.), 5,203,886 (Sheldon et al.), 5,282,875 (Wood et al.), 5,738,696 (Wu et al.), and 5,863,308 (Qi), the disclosures of which are incorporated herein by reference. Further details regarding nonwoven abrasive products can be found, for example, in U.S. Pat. No. 2,958,593 (Hoover et al.), the disclosure of which is incorporated herein by reference.

Methods for abrading with abrasive aggregates according to the present invention may range from snagging (i.e., high pressure high stock removal) to polishing (e.g., polishing medical implants with coated abrasive belts), wherein the latter is typically done with finer grades (e.g., less ANSI 220 and finer) of abrasive particles. The abrasive aggregates may also be used in precision abrading applications, such as grinding cam shafts with vitrified bonded wheels. The size of the abrasive aggregates grain (and abrasive particles comprising such aggregates) used for a particular abrading application will be apparent to those skilled in the art.

Abrading with abrasive articles according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive aggregates according to the present invention may be used to abrade workpieces such as aluminum metal, carbon steels, mild steels, tool steels, stainless steel, hardened steel, titanium, glass, ceramics, wood, wood like materials, paint, painted surfaces, organic coated surfaces and the like. The applied force during abrading typically ranges from about 1 to about 100 kilograms.

Abrasive aggregates according to the present invention may be also used in loose form or in a slurry wherein abrasive aggregate is dispersed in liquid medium (e.g., water).

Referring again to FIG. 1, in one embodiment the solid particulates 84 are abrasive grains and the binder 82 is present in a relatively low volume ratio of, for example, 0.2 to 2.0. This provides an aggregate comprising principally abrasive grain (preferably 125–1500 micron size). Binder 82 conforms closely to the outermost surfaces 88 of the solid particles. Normally the thickness of the binder 82 on the outermost surfaces 88 of the particles is relatively thin and is dependent upon the size of the particles. Typically, the thickness of the binder 82 is about 10 percent or less of the cross-sectional dimension of the particle, usually between about 0.05 microns and 150 microns. Such aggregates can, in certain embodiments, provide abrasive articles with consistently high cut rates for longer periods of time. For example, abrasive articles having cut rates of up to 200 percent, and life times of up to 500 percent (typically 200–500 percent) based upon comparative products, have been obtained. The abrasive article using such aggregates provides more consistent performance including work piece finish over time. Additionally, the increased surface area of the aggregate particulates caused by the high degree of conformity of binder 82 to abrasive grains 84, provides a particulate which adheres strongly to the make coat of abrasive articles incorporating or carrying these particulates.

The following examples will further illustrate specific embodiments of the present invention. Those of ordinary skill in the art will recognize that the present invention also includes modifications and alterations of the embodiments set out in the examples and that the illustrative examples do not limit the scope of the claimed invention.

EXAMPLES

The following abbreviations are used in the examples (All parts, percentages, ratios, etc., in the examples are by weight unless otherwise indicated):

AO: heat treated fused aluminum oxide abrasive grain, commercially available from Treibacher, Villach, Austria under the trade designation "ALODUR BFRPL".

AOP: alpha-aluminum oxide powder, commercially available from Alcoa under the trade designation "A-16 SG".

ASF: amorphous silica filler, commercially available from DeGussa Corp. (Richfield Part, N.J.), under the trade designation "OX-50".

AG321: sol gel-derived alumina-based abrasive grain commercially available from 3M Company, St. Paul, Minn. under the trade designation "Cubitron 321".

BP: boehmite (gamma-alumina monohydrate), commercially available from Condea Chemical, Hamberg, Germany under the trade designation "Disperal".

CaCO3: calcium carbonate filler, commercially available from J. M. Huber Corp., Quincy, Ill., under the trade designation "Chem Q 325".

CH: cumene hydroperoxide, commercially available from Aldrich Chemical Co., Milwaukee, Wis. as item no. 24,750-2.

CRY: sodium cryolite, commercially available from Tarconard Trading a/s, Avemakke Nyberg, Denmark, under the trade designation "RTN".

IO: red iron oxide powder, commercially available from Elementis Pigments Inc., E. St. Louis, Ill., under the trade designation "Kroma RO-8097".

KB1: photo initiator 2,2-dimethoxy-1,2-diphenyl-1-ethanone, commercially available from Sartomer Co. under the trade designation "ESACURE KB1".

KBF4: potassium tetrafluoroborate SPEC 102 and 104 commercially available from Atotech USZ Inc., Cleveland, Ohio PET: 5 mil (125 micron) thick polyester film with ethylene acrylic acid (EAA) co-polymer primer, commercially available from 3M Company, St. Paul, Minn., under the trade designation "Scotchpar P990".

PH2: photo initiator 2-benzyl-2-N,N-dimethylamino-1-(4-morpholinophenyl)-1-butanone, commercially available from Ciba Geigy Corp. under the trade designation "Irgacure 369".

SC: silicon carbide abrasive grain, commercially available from 3M Company, St. Paul, Minn.

REO: solution prepared by blending a lanthanum, neodymium, and yttrium nitrate solution [20.5% La(NO$_3$)$_3$.6H$_2$O, 20.1% Nd(NO$_3$)$_3$.6H$_2$O, 26.1% Y(NO$_3$)$_3$.6H$_2$O; available from Molycorp of Lourviers, Colo.] with a sufficient amount of MGN and cobalt nitrate [15% Co(NO$_3$)$_3$.6H$_2$O; available from Hall Chemical of Wickliffe, Ohio] to provide a solution containing about 5.8% La(NO$_3$)$_3$.6H$_2$O, about 5.8% Nd(NO$_3$)$_3$.6H$_2$O, about 7.1% Y(NO$_3$)$_3$.6H$_2$O, about 14.4% Mg(NO$_3$)$_3$.6H$_2$O, about 0.4% Co(NO$_3$)$_3$.6H$_2$O, and the balance deionized water.

SCA: silane coupling agent 3-methacryloxypropyl-trimethoxysilane, commercially available from OSI Specialties, Inc., Greenwich, Conn., under the trade designation "A-174".

SGP: alumino-boro-silicate glass powder, 325 mesh, commercially available from Specialty Glass Inc., Oldsmar, Fla., under the trade designation "SP1086".

TATHEIC: triacrylate of tris(hydroxyethyl)isocyanurate, commercially available from Sartomer Co. under the trade designation "SR368".

TMPTA: trimethylol propane triacrylate, commercially available from Sartomer Co. under the trade designation "SR351".

Procedure #1: General Procedure for Making a Ceramic Aggregate Precursor Slurry

An abrasive slurry was prepared by thoroughly mixing abrasive grain, glass powders, acrylate resin, and initiators, using a mixer (obtained from Hobart Corporation, Troy, Ohio; model number A120T). Specific formulations can be found in Tables 2, 4, 6, 9, 12, and 13. The abrasive slurry was mixed in the mixer on low speed using a flat-beater style impeller for 30 minutes and heated to a temperature within the range from about 90° F. (32° C.) to about 120° F. (49° C.) due to mechanical heating and heat of reaction. At this point, the abrasive slurry was very thick with cement-like handling characteristics. The mixed slurry was then placed in a refrigerator for at least 45 minutes to cool before further processing. The temperature of the refrigerator was in the range from about 40° F. (4° C.) to about 45° F. (7° C.).

Procedure #2: General Procedure for Making Ceramic Aggregate Precursor Particles The ceramic aggregate precursor slurry was formed into aggregate precursor particles with the aid of the "QUADRO COMIL" material forming apparatus (obtained from Quadro Incorporated, Milbourne, N.J. under the trade designation "QUADRO COMIL"; model number 197). Depending on the desired cross sectional shape of the ceramic aggregate precursor particles, different shaped orifices were used. Conical screens with circular shaped hole orifices were used to produce ceramic aggregate precursor particles with circular shaped cross sections. Conical screens with square shaped hole orifices could also be used to produce ceramic aggregate precursor particles with square shaped cross sections. The slurry was added to the hopper of the "QUADRO COMIL" by hand while the impeller was spinning at a preset speed (rpm) of 350 rpms. The rotating impeller forced the slurry through the orifices in the conical screen and when a critical length (typically, a critical length is reached when the weight of the particle is greater than any adhesive force between the formed composition and the perforated substrate) was reached, the filamentary shaped ceramic aggregate precursor particles separated from the outside of the screen, and fell by gravity through a UV curing chamber (obtained from Fusion UV Systems, Gaithersburg, Md.; model #DRE 410 Q) equipped with two 600 watt "d" Fusion lamps set at "high" power. The ceramic aggregate precursor particles were at least partially cured by exposure to the UV radiation and thereby converted into handleable and collectable particles.

In some of the examples below the ceramic aggregate precursor particles were further at least partially cured by placing the particles in aluminum pans and at least partially thermally curing them in a forced-air oven (obtained from Lindberg/Blue M Company, Watertown, Wis.; model number POM-246F) for about 5 hours to about 8 hours and at about 340° F. (171° C.) to about 360° F. (182° C.). Optionally, the at least partially cured ceramic aggregate precursor particles were reduced in size by passing them through the "QUADRO COMIL". Typically, particles are reduced in size by passing them through the "QUADRO COMIL," with the "QUADRO COMIL" equipped with conical screens that have relatively larger orifices than those used for forming ceramic aggregate precursor particles. For particle size reduction, the impeller rotation speed of the "QUADRO COMIL" was set at 252 rpm.

Procedure #3: General Procedure for Heating Ceramic Aggregate Precursor Particles to Make Ceramic Aggregate Particles In the examples below, rod-shaped ceramic aggregate precursor particles were converted into rod-shaped ceramic aggregate particles by a two-step firing process. The two steps of the firing process were carried out at separate times, but could optionally be completed sequentially in one firing furnace cycle.

First Firing Step (i.e., pre-firing)

In the first firing step, rod-shaped ceramic aggregate precursor particles were pre-fired in order to remove acrylate resin used in the particle forming process described in Procedure #2, and to cause the ceramic binder precursor material to sufficiently bond together to provide handleable and collectable particles. Ceramic aggregate precursor particles were reduced in size to provide an average particle size (see examples for specific average particle sizes) to provide ceramic aggregate particles suitable to make coated abrasive articles. Then the particles were spread ⅝ inch (16 mm) thick in 3.5 inch×7.5 inch (89 mm×190 mm) alumina pans (obtained from Coors Ceramics Co., Golden Colo.) and heated in air in a laboratory furnace (obtained from Lindberg/Blue M Company, Watertown, Wis.; model number BF 117) according to the following schedule:

a. about 3.6° F. (2° C.)/minute heating rate from about room temperature to about 662° F. (350° C.)
b. about a 2 hour soak at about 662° F. (350° C.)
c. about 3.6° F. (2° C.)/minute from about 662° F. (350° C.) to about 1157° F. (625° C.)
d. about a 1 hour soak at about 1157° F. (625° C.)
e. furnace cool to about room temperature (the furnace was shut off, the particles remained in the furnace, and both the furnace and the particles cooled at an uncontrolled rate to about room temperature).

After the pre-fire step, the ceramic aggregate particles were crushed by hand pressure to break up longer filamentary particles and particle clusters that had bonded together. In Examples #2–#6, the ceramic aggregate particles were used after the pre-fired state without further heat treatment for grinding tests.

Second Firing Step for Examples #1 and #7–#14

In the second firing step for Examples #1 and #7–#14, pre-fired ceramic aggregate particles were re-heated from room temperature to a final temperature in the range from about 1200° F. (650° C.) to about 1832° F. (1000° C.) in order to cause partial or complete densification of the ceramic binder precursor material. In preparation for the final firing, pre-fired particles were placed in a 500 ml glass jar along with 10% wt BP. The mixture was then tumbled by hand for approximately one minute to coat the particles to prevent them from sticking to one another in the subsequent high-temperature firing step. BP-coated particles were placed in the aluminum trays and fired in the laboratory furnace (obtained from Lindberg/Blue M Company, Watertown, Wis.; model number BF 117) according to the following schedule:

a. about 9° F. (5° C.)/minute heating rate from about room temperature to final temperature in the range from about 1200° F. (650° C.) to about 1832° F. (1000° C.)
b. about a 4 hour soak at final temperature in the range from about 1200° F. (650° C.) to about 1832° F. (1000° C.)
c. furnace cool to about room temperature (the furnace was shut off, the particles remained in the furnace, and both the furnace and the particles cooled at an uncontrolled rate to about room temperature)

Fired ceramic aggregate particles were then tumbled in a polyethylene-lined cement mixer (obtained from CF Glico Inc., Grafton, Wis., model number 59016A) for 15 minutes to break up clusters of particles. The fired particles were then screened using a ro-tap sieve shaker, model number RX 29, and 8 inch (20.3 cm) diameter brass sieves (obtained from W.S. Tyler, Mentor, Ohio; model number RX 29) to remove the alumina dust and to collect the desired ceramic aggregate particle sizes (see examples for specific particle size). Screened particles were rinsed with deionized water to remove residual alumina dust and the washed particles were then spread in an alumina pan and dried overnight in a forced-air oven at 212° F. (100° C.) (obtained from Despach Industries, Minneapolis, Minn.; model number ALD2-11).

Second Firing Step for Examples #15–#19

In the second firing step for Examples #15–#19, pre-fired ceramic aggregate particles were re-heated to a final temperature of about 2732° F. (1500° C.) in order to cause partial or complete densification of the ceramic binder precursor. Approximately 100 grams of pre-fired ceramic aggregate particles were placed in 3 inch diameter platinum crucibles and then heated in a laboratory box furnace (obtained from CM, Bloomfield, N.J., under the trade designation "CM RAPID TEMP") according to the following schedule:

a. about 9° F. (5° C.)/minute heating rate from about room temperature to final temperature of about 1500° C.
b. about a 90 minute soak at final temperature of about 1500° C.
c. furnace cool to about room temperature (the furnace was shut off, the particles remained in the furnace, and both the furnace and the particles cooled at an uncontrolled rate to about room temperature)

The fired particles were then screened using a ro-tap sieve shaker, model number RX 29, and 8 inch (20.3 cm) diameter brass sieves (obtained from W.S. Tyler, Mentor, Ohio; model number RX 29) to remove the alumina dust and to collect the desired ceramic aggregate particles size (see examples for specific sizes). Screened particles were rinsed with deionized water to remove residual alumina dust and the washed particles were then spread in an aluminum pan and dried overnight for about 10 hours in a forced-air oven at about 212° F. (100° C.) (obtained from Despach Industries, Minneapolis, Minn.; model number ALD2-11).

Procedure #4: General Procedure for Making Film-backed Coated Abrasive Articles Using Ceramic Aggregate Particles Made According to the Present Invention Examples of coated abrasive articles with film backings and acrylate make and size resins were prepared using ceramic aggregate particles after the first firing step and/or second firing step. Make and size coat resin was prepared according to the formulation listed in Table 1. Quantities are listed as weight percentages.

TABLE 1

Make and size coat resin formulation for film-backed abrasive articles

| Material | Quantity (%) |
| --- | --- |
| TMPTA | 39.4 |
| TATHEIC | 16.9 |
| PH2 | 0.6 |
| SCA | 2.0 |
| KBF4 | 39.2 |
| ASF | 2.0 |

PET film 0.005 inch (127 μm) thick was used for the backing. The film had a 0.0008 inch (20 micrometers) thick EAA prime coating. The make resin was knife-coated 0.012 inch (300 micrometers) thick onto the primed surface of the film using a six inch universal draw-down knife (obtained from Paul Gardner, Pompano Beach, Calif., model number AP-G06). Ceramic aggregate particles were poured by hand onto the wet resin and rolled back and forth by hand several times to distribute the particles evenly on the backing, and then the excess particles were shaken off. The resulting coated sample was then taped onto a metal plate and cured by placing the sample on a conveyor and passing it through a UV cure system (obtained from Fusion UV Systems, Gaithersburg, Md.; model #DRE 410 Q) using a 600 watt "d" Fusion UV lamp set at "high" power. The coated sample was passed three times through the UV cure system at about 30 ft/min (9.1 meters/min). The coated sample was then flexed over a 2 inch (5 cm) diameter bar in order to make the coated sample more suitable for installation into the Rocker Drum Test apparatus (see Test Procedure #1 below). A thin size coating of the same resin mixture used for the make coat was then applied by hand onto the coated sample with a paint brush and the excess resin was blotted off with a paper towel. The size coated sample was then passed through the UV cure system three times at about 30 ft/min (9.1 meters/min). The cured coated sample was then flexed again over a 2 inch (5 cm) diameter bar in order to make the coated sample more suitable for installation into the Rocker Drum Test apparatus (see Test Procedure #1 below).

Procedure #5: General Procedure for Making Cloth-backed Coated Abrasive Articles Using Ceramic Aggregate Particles Made According to the Present Invention Examples of coated abrasive articles with polyester cloth backings and phenolic-based make and size resins were prepared with ceramic aggregate particles made according to the present invention. The Y-weight backing cloth was a sateen weave polyester with a basis weight of approximately 535 g/m$^2$ (obtained from Wisselink Textiles, Aalten, Netherlands). The make resin was a 52:48 mixture by weight of $CaCO_3$:water-based phenolic (obtained from Georgia-Pacific Resins, Columbus, Ohio; product number GP23155B). An "ACCU LAB" draw-down apparatus (obtained from Paul Gardner Co., Pompano Beach, Fla., under the trade designation "ACCU LAB") and a #90 wire-wound coating rod (obtained from Paul Gardner Co., Pompano Beach, Fla.) was used to spread a uniform coating of make resin onto the polyester backing. The make coating weight for the #90 wire wound coating rod setting on the "ACCU LAB" was approximately 230 g/m$^2$ on a dry weight basis. Make coating weight was determined for a given setting of the #90 wire wound coating rod on the "ACCU LAB" by the following procedure: weighing a backing sample, applying a make coat to the backing sample using the "ACCU LAB" apparatus at a given setting, drying the make coat in a convection oven (obtained from Precision Scientific, Chicago, Ill.; model number 8) about 2 hours at about 190° F. (88° C.), and then weighing the dried make coated backing. Coating weight=(dried make coated backing sample weight—the backing sample weight)/(area of the backing sample). Ceramic aggregate particles made according to the present invention were then poured by hand onto the wet make resin and rolled back and forth by hand several times to distribute the particles evenly on the backing, and then the excess particles were shaken off. Coated samples were heated overnight for about 10 hours in a convection oven (obtained from Precision Scientific, Chicago, Ill.; model number 8) set at about 180° F. (82° C.). The size resin was a 52:48 mixture by weight of cryolite:water-based phenolic (obtained from Georgia-Pacific Resins, Columbus, Ohio; product number GP23155B) and was applied to the samples by hand with a paint brush. The size coated samples were heated in a convection oven (obtained from Precision Scientific, Chicago, Ill.; model number 8) for about 1 hour at about 180° F. (82° C.), and then cured for about 2 hours at about 200° F. (93° C.), followed by about 30 minutes at about 220° F. (104° C.) and about 1 hour at about 245° F. (118° C.). After curing, the coated abrasive samples were flexed over a 2 inch (5 cm) diameter bar in order to make the coated sample more suitable for installation into the Rocker Drum Test apparatus (see Test Procedure #1 below).

Test Procedure #1: Rocker Drum

Abrasive articles made according to Procedure #4 or #5 were cut into 10 inch×2.5 inch (25.4 cm×6.4 cm) sheets.

These samples were installed on a cylindrical steel drum of a testing machine. The steel drum was 13 inches (33 cm) in diameter, and was driven by an electric motor and a pushrod lever so that the drum oscillated (rocked back and forth in a small arc). A 1018 carbon steel workpiece (a workpiece is abraded by the abrasive article), 3/16 inch (0.48 cm) square, was fixed in a lever arm arrangement above the abrasive sample, and a load of about 8 lb (3.6 kg) was applied to the workpiece. As the abrasive article rocked back and forth, the workpiece was abraded, and a 3/16 inch×5.5 inch (0.48 cm×14 cm) wear path was created on the abrasive article. There were approximately 60 strokes per minute on this wear path. A compressed air stream at 20 psi (138 kPa) was directed onto the sample to clear grinding swarf and debris from the wear path. The amount of steel removed after each 1000 cycles (one cycle being one back-and-forth motion) was recorded as the "interval cut" and the "total cut" was the cumulative (total of "interval cuts") amount of steel removed at the endpoint of the test. The endpoint of the test was determined to be when a predetermined number of cycles were completed or when the cut rate dropped to less than approximately 40% of the maximum interval cut recorded for that test. This procedure is referred to herein as a "rocker drum test".

Test Procedure #2: Crush Test

Approximately 5 grams of ceramic aggregate particles were used for each test. Particles were crushed by hand and particles that were in the range from about 1 mm to about 2 mm were tested. The crushed ceramic aggregate particles were poured onto an epoxy resin lab bench top and spread out by hand to isolate individual particles. Then the particles were tested using a force gauge equipped with a flat compression foot fitting (obtained from Shimpo Instruments, Lincolnwood, Ill.; model number FGV-50). The force gauge read from 0 to 60 lbs. The flat compression foot of the force gauge was held in a horizontal position above and contacting the particle to be crushed and a constant force was applied by hand until the particle broke (particle breakage was measured by audible sound and/or feel). The maximum force applied to cause the particle to break (i.e., Crush Test Value) was recorded and the test repeated. The reported Crush Test Value was an average of at least 40 particles from a given sample.

Comparative Example A

Film-backed coated samples were prepared using organically-bonded agglomerate abrasive particles (obtained from 3M Co, St. Paul, Minn. under the trade designation "MULTICUT C"). "MULTICUT C" particles include P100 AG321 grade abrasive grains bonded together by a cryolite-filled phenolic bond system. The coated samples were made according to Procedure #4, but #100 "MULTICUT C" particles were substituted for ceramic aggregate particles made according to the present invention.

Comparative Example B

The coated abrasive articles made in Comparative Example B were prepared using a single layer of P100 AG321 grade abrasive grains electrostatically coated on a polyester backing using CaCO3-filled phenolic make resin and cryolite-filled phenolic size resin. The Y-weight backing cloth was a sateen weave polyester with a basis weight of approximately 331 g/m² (obtained from Milliken & Co., Lagrange, Ga.). The make resin was a 52:48 by weight mixture including $CaCO_3$-filled water-based phenolic resin (obtained from Georgia-Pacific Resins, Columbus, Ohio; product number GP23155B). The wet resin coating weight was approximately 150 g/m². 330 g/m² of AG321, grade P100 abrasive grains were applied electrostatically to provide a coated abrasive article. The make coat was then precured in a forced-air oven (obtained from Despach Industries, Minneapolis, Minn.; model number type S) for about 30 minutes at about 175° F. (79° C.) and about 90 minutes at about 200° F. (93° C.). Then a cryolite-filled water-based phenolic size coat was applied with a wet coating weight of approximately 177 g/m². The size coat was precured in the oven for about 30 minutes at about 175° F. (79° C.) and about 120 minutes at about 200° F. (93° C.). The coated material was then final cured in the oven for about 10 hours at about 212° F. (100° C.) and then flexed over a 2 inch (5 cm) bar in order to make the coated sample more suitable for installation into the Rocker Drum Test apparatus (see Test Procedure #1 below).

Example #1

Example #1 demonstrates that ceramic aggregate particles can be prepared according to the method of the present invention using grade #100 abrasive grit and non-crystalline binder precursor. Ceramic aggregate precursor slurry was prepared as described in Procedure #1, using a mixer (obtained from Hobart Corporation, Troy, Ohio; model number A120T) and AG321 grade P100 abrasive grain. The abrasive slurry formulation is listed in Table 2 and was combined by combining the ingredients in Table 2 in the order listed in the table. The final temperature of the abrasive slurry after mixing was approximately 90° F. (32° C.).

TABLE 2

Example 1 abrasive slurry formulation

| Material | Quantity (g) |
| --- | --- |
| TMPTA | 346.5 |
| KB1 | 3.5 |
| SGP | 672 |
| P100 AG321 | 2018 |
| Total inorganic solids content | 88 wt % |

Ceramic aggregate precursor particles were made as described in Procedure #2. The "QUADRO COMIL" was set up with a small round impellar and a 0.075 inch (19 mm) gap and a conical screen with 0.045 inch (11 mm) round orifices. The drive motor speed was set at 1600 rpm. Pre-fired particles were reduced in size with one additional pass through the "QUADRO COMIL". Precursor particles were prefired as described in Procedure #3. Prefired particles were then reduced in size with one additional pass through the "QUADRO COMIL" before final firing according to Procedure #3, except that the final firing temperature was at about 1697° F. (925° C.). The fired ceramic aggregate particles were screened, and the size fraction that passed through a #16 mesh screen and retained on a #20 mesh screen was collected. The screened particles were used to make film-backed coated abrasive articles according to Procedure #4. Coated samples of Example #1 were tested according to the Rocker-Drum test procedure (test procedure #1) and compared with samples made according to Comparative Examples A and B. The results are summarized in Table 3.

TABLE 3

Rocker-Drum test for Example #1 and Comparative Examples A and B

| Test interval (cycles) | Comparative Example A Interval Cut (g) | Comparative Example B Interval Cut (g) | Example #1 Interval Cut (g) |
|---|---|---|---|
| 1000 | 1.03 | 1.43 | 1.23 |
| 2000 | 1.09 | 1.20 | 1.26 |
| 3000 | 1.05 | 0.48 | 1.31 |
| 4000 | 1.05 | 0.23 | 1.30 |
| 5000 | 1.03 | — | 1.28 |
| 6000 | 0.97 | — | 1.26 |
| 7000 | 0.96 | — | 1.31 |
| 8000 | 0.84 | — | 1.29 |
| 9000 | 0.50 | — | 1.38 |
| 10000 | 0.13 | — | 1.05 |
| 11000 | — | — | 0.89 |
| 12000 | — | — | 0.70 |
| TotalCut(g) | 8.65 | 3.34 | 14.26 |

The results in Table 3 show that the abrasive article made in Example #1 provided interval cut rates (grams/1000 cycles) between 30 to 50% higher than the abrasive article made in Comparative Example A throughout the test. In the first 1000 cycles, Example #1 achieved a cut rate of 86% of the abrasive article made in Comparative Example B, and exceeded the cut rate of Comparative Example B for the balance of the test. The total cut of Example #1 was 165% of Comparative Example A and 427% of Comparative Example B.

Comparative Example C

The abrasive articles made in Comparative Example C were cloth-backed and were coated with organically-bonded agglomerate abrasive particles (obtained from 3M Co, St. Paul, Minn. under the trade designation "MULTICUT C"). Grade #60 "MULTICUT C" particles include grade #60 AG321 abrasive grains bonded together by a cryolite-filled phenolic bond system. The coated samples were made according to Procedure #4, but #60 "MULTICUT C" particles were substituted for ceramic aggregate particles made according to the present invention.

Comparative Example D

The abrasive articles made in Comparative Example D were commercially available coated abrasive articles (obtained from 3M Co., St. Paul Minn., under the trade designation "3M 967F"). "3M 967F" grade #60 included a single layer of AG321 grade #60 abrasive grains electrostatically coated onto a polyester cloth backing with phenolic based make and size resins.

Examples #2–#5

Ceramic aggregate particles produced for Examples #2–#5 demonstrated the use of larger grit size abrasive (grade #60) and non-crystalline ceramic binder precursor. In particles for Example #2, the weight ratio of abrasive grit to non-crystalline binder precursor was 1.5, and in Example #3, the weight ratio of abrasive grit to non-crystalline binder precursor was 3.0. In Examples #4 and #5, two different ceramic aggregate particle sizes were combined in fabricating coated abrasive articles. Ceramic aggregate precursor slurries were prepared as described in Procedure #1, using AG321 grade #60 abrasive grain. The abrasive slurry formulation is listed in Table 4 and was combined by first combining the ingredients in Table 4 in the order listed except for the SGP and AG321 grade #60. The SGP and AG321 grade #60 were first combined together and then slowly added to the remaining ingredients in Table 4.

TABLE 4

Abrasive slurry formulations for Examples #2–#5

| Material | Example #2 and #4 Quantity (g) | Example #3 and #5 Quantity (g) |
|---|---|---|
| TMPTA | 891 | 594 |
| KB1 | 9.0 | 6.0 |
| CH | 4.0 | 4.0 |
| SGP | 2120 | 1509 |
| #60 AG321 | 3180 | 4527 |
| Total inorganic solids content | 86 wt % | 91 wt % |

Mixing was done in a mixer with a flat beater rotor and on the slowest speed setting (obtained from Hobart Corporation, Troy, Ohio; model number A120T). After the SGP/AG321 mixture was added to the resin mixture, the speed was increased to "medium". Mixing was continued for about 25 minutes as described in Procedure #1. The final temperature of the mixture was in the range from about 100° F. (38° C.) to about 120° F. (49° C.).

Ceramic aggregate precursor particles were made as described in Procedure #2. Particles made for Examples #2 and #4 were kept separate from particles made for Examples #3 and #5 through all making and firing processes. The "QUADRO COMIL" was set up with a small round impellar, a 0.075 inch (1.90 mm) gap, a conical screen with 0.062 inch (1.57 mm) round grater-type orifices, and the drive motor speed was set at 470 rpm. After passing the slurries through the "QUADRO COMIL" and UV curing system, the at least partially cured precursor particles were placed in aluminum pans and thermally-cured in a forced-air oven (obtained from Lindberg/Blue M Company, Watertown, Wis.; model number POM-246F) for about 6 hours at about 350° F. (177° C.). After being at least partially thermally cured the ceramic aggregate precursor particles were reduced in size with one additional pass through the "QUADRO COMIL" using a 0.075 inch (1.90 mm) gap and a 0.094 inch (2.39 mm) grater screen. The particles were then prefired as described in Procedure #3. The prefired, ceramic aggregate particles were screened using a vibratory grader (obtained from Exolon Co., Tanawanda, N.Y., model number 501) and a #24 mesh stainless steel screen (obtained from Cambridge Wire Cloth Co., Cambridge, Md.). Particles that passed through the #24 mesh screen ("fine" particle size) were separated from the particles that were retained on the #24 mesh screen ("coarse" particle size). Both particle sizes were collected and used to make coated abrasive articles to be tested.

The screened particles were used to make cloth-backed coated abrasive articles according to Procedure #5. For Examples #2 and #3, only the "coarse" particles were used to make coated abrasive articles. For Examples #4 and #5, the coarse particles were coated onto the sample first and then the open space between the "coarse" particles was partially filled by applying the "fine" particles to make coated abrasive articles according to Procedure #5. All coated samples were dried, sized, and cured as described in Procedure #3. Coated samples of Examples #2–#5 were tested according to the Rocker-Drum test procedure (test procedure #1) and compared with the samples of Comparative Examples C and D. For these tests the endpoint of the test was after 18,000 cycles or when the cut rate for a sample dropped to less than about 40% of the maximum interval cut recorded for that sample. The test results are summarized in Table 5.

TABLE 5

Rocker-Drum test for Examples #2–#5 and Comparative Examples C and D

| Test interval (cycles) | Comparative Example C Interval cut (g) | Comparative Example D Interval cut (g) | Example #2 Interval cut (g) | Example #3 Interval cut (g) | Example #4 Interval cut (g) | Example #5 Interval cut (g) |
|---|---|---|---|---|---|---|
| 1000 | 1.14 | 1.74 | 0.99 | 1.21 | 1.33 | 1.18 |
| 2000 | 1.30 | 1.82 | 1.24 | 1.43 | 1.75 | 1.33 |
| 3000 | 1.42 | 1.72 | 1.42 | 1.47 | 1.84 | 1.38 |
| 4000 | 1.46 | 1.43 | 1.42 | 1.51 | 1.86 | 1.49 |
| 5000 | 1.48 | 0.53 | 1.54 | 1.57 | 1.85 | 1.51 |
| 6000 | 1.59 | — | 1.54 | 1.47 | 1.75 | 1.53 |
| 7000 | 1.60 | — | 1.63 | 1.26 | 1.77 | 1.57 |
| 8000 | 1.74 | — | 1.50 | 0.97 | 1.87 | 1.65 |
| 9000 | 1.61 | — | 1.43 | 0.78 | 1.85 | 1.65 |
| 10000 | 1.53 | — | 1.48 | 0.60 | 1.75 | 1.54 |
| 11000 | 1.51 | — | 1.44 | 0.55 | 1.39 | 1.31 |
| 12000 | 1.25 | — | 1.30 | 0.41 | 0.87 | 1.12 |
| 13000 | 0.78 | — | 1.38 | 0.36 | — | 1.03 |
| 14000 | — | — | 1.20 | — | — | 0.81 |
| 15000 | — | — | 0.98 | — | — | 0.69 |
| 16000 | — | — | 0.73 | — | — | 0.42 |
| 17000 | — | — | 0.54 | — | — | — |
| 18000 | — | — | 0.36 | — | — | — |
| Total Cut (g) | 18.48 | 7.24 | 22.12 | 13.59 | 19.88 | 20.21 |

As shown in Table 5, some coated samples made with ceramic aggregate particles made according to the present invention provided total cuts of 108% to 120% of that for Comparative Example C, and 275% to 305% of that for Comparative Example D. The total cut of the abrasive article made in Example #3 was limited by premature shelling of the particles from the backing.

Examples #6–#8

The abrasive articles made in Examples #6–#8 were designed to demonstrate the effect that firing temperature, used to make ceramic aggregate particles, has on cut performance of abrasive articles. The ceramic aggregate particles used to make abrasive articles in Examples #6–#8 were also designed to demonstrate that two grades of abrasive grains can be used in a method of the present invention to produce ceramic aggregate particles.

Ceramic aggregate precursor slurry was prepared as describe in Procedure #1, using a combination of AG321 grades #60 and #320 abrasive grains. The abrasive slurry formulation is listed in Table 6 and was combined by first combining the ingredients in Table 6 in the order listed except for the SGP and AG321 grades #60 and #320. The SGP and AG321 grades #60 and #320 were first combined together and then slowly added to the remaining ingredients in Table 6.

TABLE 6

Abrasive slurry formulation for Examples #6–#8

| Material | Quantity (g) |
|---|---|
| TMPTA | 600 |
| KB1 | 6.0 |
| CH | 4.0 |
| SCA | 50.0 |
| SGP | 1600 |
| #60 AG321 | 3200 |
| P320 AG321 | 800 |
| Total inorganic solids content | 90 wt % |

Mixing was done in a mixer with a flat beater rotor and on the slowest speed setting (obtained from Hobart Corporation, Troy, Ohio; model number A120T). After the SGP/AG321 mixture was added to the resin mixture, the speed was increased to "medium". Mixing was continued for about 25 minutes as described in Procedure #1. The final temperature of the mixture was about 100° F. (38° C.). Ceramic aggregate precursor particles were made as described in Procedure #2. The "QUADRO COMIL" was set up with a solid impeller (Arrow 1701), a 0.075 inch (1.90 mm) gap, a conical screen with 0.050 inch (1.27 mm) round, grater-type orifices, and the drive motor was set at 253 rpm. After passing the slurry through the "QUADRO COMIL" and UV curing system, the at least partially-cured ceramic aggregate precursor particles were placed in aluminum pans and thermally-cured in a forced-air oven (obtained from Lindberg/Blue M Company, Watertown, Wis.; model number POM-246F) for about 6 hours at about 350° F. (177° C.). The ceramic aggregate precursor particles were then reduced in size by causing them to pass through the "QUADRO COMIL" using a 0.075 inch (1.90 mm) gap and a 0.062 inch (1.57 mm) grater screen. After the reduction in size the ceramic aggregate precursor particles were screened to get rid of fine "dust" using a vibratory grader (obtained from Exolon Co., Tanawanda, N.Y., model number 501) and a #36 mesh stainless steel screen (obtained from Cambridge Wire Cloth Co., Cambridge, Md.). Particles that were retained on the #36 mesh screen were collected.

Particles for Example #6 were prefired and screened according to Procedure #3. Particles that passed through a #16 mesh screen but were retained on a #30 mesh screen were retained and used to make samples for Example #6. Particles for Examples #7 and #8 were fired as described in Procedure #3. The final temperatures in the second firing step were about 1382° F. (750° C.) and about 1697° F. (925° C.) for Example #7 and Example #8 respectively. Then the particles for Examples #7 and #8 were screened and washed as described in Procedure #3. Particles that passed through a #16 mesh screen but were retained on a #30 mesh screen were retained and used to make samples for Examples #7 and #8.

The particles made for Examples #6–#8 were used to make cloth-backed coated abrasive articles as described in Procedure #5. A single coating of fired particles was applied and the coated samples dried, sized and cured according to Procedure #5. The abrasive articles of Examples #6–#8 were tested on the Rocker-Drum according to Test Procedure #1 and compared with the abrasive articles of Comparative Examples C and D. For these tests, the endpoint was after 6000 Rocker-Drum cycles were completed. The test results are summarized in Table #7.

TABLE 7

Rocker-Drum test results for Examples #6–#8

| Test interval (cycles) | Comparative Example C Interval cut (g) | Comparative Example D Interval cut (g) | Example #6 Interval cut (g) | Example #7 Interval cut (g) | Example #8 Interval cut (g) |
|---|---|---|---|---|---|
| 1000 | 1.20 | 1.80 | 1.13 | 1.51 | 1.77 |
| 2000 | 1.33 | 1.79 | 1.37 | 1.79 | 2.10 |
| 3000 | 1.40 | 1.91 | 1.46 | 1.89 | 2.27 |
| 4000 | 1.46 | 1.84 | 1.51 | 1.95 | 2.31 |
| 5000 | 1.47 | 1.28 | 1.60 | 2.11 | 2.39 |
| 6000 | 1.51 | 0.21 | 1.74 | 2.14 | 2.28 |
| Total Cut (g) | 8.37 | 8.83 | 8.81 | 11.39 | 13.12 |

As shown in Table 7, the abrasive article made in Example #8 made with ceramic aggregate particles fired at about 1697° F. (925° C.), provided a total cut of about 150% of the abrasive article in Comparative Examples C and D. The abrasive article in Example #8 achieved a maximum cut rate of about 158% of the abrasive article in Comparative Example C and of about 125% of the abrasive article in Comparative Example D. The effect of increased firing temperature on ceramic aggregate particles is reflected by the increasing total cut and maximum cut rates for the abrasive articles in Examples #7 and #8, as compared with that in Example #6.

Examples #9–#14

The particles used in Examples #9–#14 show the effect of increasing firing temperature in the second firing step in Procedure #3 on the Crush Strength and porosity of ceramic aggregate particles. The ceramic aggregate particles used to make abrasive articles in Example #2 were used as particles in Examples #9–#11. For Example #9, the particles were used as made for Example #2. For Examples #10 and #11, the particles were "re-fired" according to the second firing step described in Procedure #3 to final firing temperatures listed in Table 8. The ceramic aggregate particles used to make abrasive articles in Example #3 were used as particles in Examples #12–#14. For Example #12, the particles were used as made for Example #3. For Examples #13 and #14, the prefired particles from Example #3 were fired according to the second firing step in Procedure #3 to final firing temperatures listed in Table 8. Table 8 also lists the following physical properties of the ceramic aggregate particles: Total Pore Volume, Volume Percent Porosity, Apparent Bulk Density, and average Crush Strength. Total Pore Volume and Apparent Particle Volume were measured by mercury intrusion porosimetry analysis, using a "MICROMETIRICS AUTO PORE" instrument (obtained from Micromeritics Corp., Norcross Ga., under the trade designation "MICROMETIRICS AUTO PORE"). Total Pore Volume is the mass-normalized total volume of open space within the ceramic aggregate particle that is connected to the outer surface of the particle that allows penetration of mercury, due to capillary action, into the ceramic aggregate particle. Mercury intrusion porosimetry allows measures penetration of mercury into particles with pore diameters in the range from about 0.07 micrometers to about 900 micrometers. Volume Percent Porosity is calculated as follows: (Total Pore Volume/Apparent Particle Volume) 100. Apparent Particle Volume is the volume of mercury displaced by the ceramic aggregate particle. Apparent Bulk Density is the ratio of the ceramic aggregate particle mass to Apparent Particle Volume. Crush Strength is the average force required to cause a particle to break under a compressive load and is described further in Test Procedure #2.

TABLE 8

Physical properties for Examples #9–#14

| | EXAMPLE | | | | | |
|---|---|---|---|---|---|---|
| | 9 | 10 | 11 | 12 | 13 | 14 |
| Firing Conditions Temperature (° C.)/Time (hr) | 625/1 | 750/4 | 925/4 | 625/1 | 750/4 | 925/4 |
| Total Pore Volume (mL/g) | 0.061 | 0.019 | 0.007 | 0.055 | 0.042 | 0.012 |
| Volume % Porosity | 15.71 | 5.37 | 2.09 | 15.38 | 12.22 | 3.74 |
| Apparent Bulk Density (g/cc) | 2.57 | 2.77 | 2.87 | 2.79 | 2.90 | 3.24 |
| Crush Strength (lb) | 17.9 | 52.2 | >>60 (exceeded test gage capacity) | 7.3 | 21.2 | 44.0 |

Examples #15–#19

The ceramic aggregate particles in Examples #15–#19 are designed to demonstrate the use of crystalline ceramic binder precursor material (e.g., alpha alumina powder) and fused aluminum oxide, ceramic aluminum oxide, or silicon carbide abrasive particulates to make ceramic aggregate particles. The ceramic aggregate precursor particles in Examples #15–#19 were prepared in a similar manner as the ceramic aggregate precursor particles in Examples #6–#8. Ceramic aggregate precursor slurries were prepared as described in Procedure #1, using either AG321 abrasive grain (for Examples #15 and #16), AO abrasive grain (for Examples #17 and #18) or SC abrasive grain (for Example #19). In Examples #15–#19, the ceramic binder precursor material SGP, used in Examples #6–#8, was replaced with AOP. The abrasive slurry formulations for Examples #15–#19 are shown in Table 9 and were combined by first mixing together the ingredients in Table 9 in the order listed except for the AOP and AG321 grades #60 and #320 (Examples #15 and #16), the AO grade #80 (Examples #17 and #18), or the SC grade #80 (Example #19). In each of these examples, the AOP was first combined with the AG321 grade #60 and #320, the AO grade #80, or the SC grade #80, and the combined mixtures were then slowly added to the remaining ingredients in Table 9.

TABLE 9

Abrasive slurry formulations for Examples #15–#19

| Material | Example #15 and #16 Quantity (g) | Example #17 and #18 Quantity (g) | Example #19 Quantity (g) |
| --- | --- | --- | --- |
| TMPTA | 300 | 150 | 300 |
| KB1 | 3.0 | 1.5 | 3.0 |
| CH | 2.0 | 1.0 | 2.0 |
| SCA | 15.0 | 4.0 | 8.0 |
| AOP | 1000 | 550 | 1100 |
| #60 AG321 | 2000 | — | — |
| P320 AG321 | 500 | — | — |
| P80 AO | — | 1375 | — |
| P80 SC | — | — | 2750 |
| Total inorganic solids content | 92 wt % | 93 wt % | 93 wt % |

Mixing was done in a mixer with a flat beater rotor and on the slowest speed setting (obtained from Hobart Corporation, Troy, Ohio; model number A120T). After the AOP/AG321 or AO mixture was added to the resin mixture, the speed was increased to "medium". Mixing was continued for about 25 minutes as described in Procedure # 1. The final temperature of each mixture was about 116° F. (47° C.). Ceramic aggregate precursor particles were made for Examples #15–#19 as described in Procedure #2. The "QUADRO COMIL" setup was the same for Examples #15–#19, using a solid impeller (Arrow 1701) with a 0.175 inch (4.44 mm) gap and a conical screen with 0.050 inch (1.27 mm) round, grater-type orifices. The drive motor was operated at 350 rpm. After passing the slurries through the "QUADRO COMIL" and UV curing system, the at least partially cured ceramic aggregate precursor particles were placed in aluminum pans and at least partially thermally cured in the forced-air oven for about 6 hours at about 350° F. (177° C.). The ceramic aggregate precursor particles were then reduced in size by causing them to pass through the "QUADRO COMIL" using a carbide-tipped Arrow 1607 impeller at a 0.175 inch (4.44 mm) gap and a 0.079 inch (2.00 mm) grater screen. After the reduction in size the ceramic aggregate precursor particles were screened and the particle size fraction greater than #36 mesh (0.0185 inch, 0.47 mm) was collected.

Ceramic aggregate particles made for Examples #15–#19 were made as described in Procedure #3, except that in the prefire step the particles were held at a maximum temperature of about 1832° F. (1000° C.) for about 4 hours. Also, the BP coating described in Procedure #3 was not used to make the ceramic aggregate particles in Examples #15–#19. Also, after pre-firing, ceramic aggregate precursor particles for Examples #15–#18 were further reduced in size by again causing them to pass through the "QUADRO COMIL" using a carbide-tipped Arrow 1607 impeller at a 0.0175 inch (4.44 mm) gap and using a 0.079 inch (2.0 mm) grater screen. After further reduction in size, the ceramic aggregate precursor particles were screened as described in Procedure #3, and the particle size fraction larger than 20 mesh (0.0320 inch, 0.81 mm) and smaller than 12 mesh (0.0661 inch, 1.70 mm) was collected.

For Examples #15, #17 and #19, the second firing step according to Procedure # 3 was performed by placing about 100 grams of screened, prefired ceramic aggregate particles in a 3 inch (7.6 cm) diameter platinum crucible and then heating in a laboratory box furnace (obtained from CM Rapid Temp Furnace, Bloomfield N.J. under the trade designation "RAPID TEMP"). In the second firing step, the particles were held at a maximum temperature of about 2732° F. (1500° C.) for about 90 minutes. The particles were then allowed to cool to room temperature by shutting off the "RAPID TEMP" box furnace and allowing it to cool to room temperature.

For Examples #16 and #18 prefired ceramic aggregate particles were impregnated with REO sintering aid solution before the second firing step. The pre-fired ceramic aggregate particles were impregnated by mixing 25 ml of REO solution per 100 grams of prefired particles with the prefired particles. The mixture was tumbled in a rotating, polyethylene-lined container for about 10 minutes to distribute the REO solution through the particles. Impregnated particles were then placed in aluminum pans and placed in a forced-air oven (obtained from Despach Industries, Minneapolis, Minn.; model number ALD2-11) and dried for about 2 hours at about 100° C. The particles were then removed and allowed to cool down to about room temperature. Then the particles were passed through a rotary kiln that was heated to about 1200° F. (650° C.). The rotary kiln had a "hot zone" that was about 12 inches (30.5 cm) and a silicon carbide rotary tube that was about cm in diameter, about 1.1 m long, and was elevated at about 2.5° inclination. The particle residence time was about 5 minutes through the length of the tube. After being passed through the rotary kiln the particles were then fired at about 2732° F. (1500° C.) for about 90 minutes according to the second firing step for the ceramic aggregate particles used in Examples #15, #17 and #19.

The ceramic aggregate particles made for Examples #15–#18 were used to make cloth-backed coated abrasive articles as described in Procedure #5. A single coating of ceramic aggregate particles was applied to the cloth backing and the coated samples dried, sized and cured according to Procedure #5. The abrasive articles of Examples #15–#18 were tested and compared against abrasive articles of Comparative Examples C and D on the Rocker-Drum according to Test Procedure #1. The test results are summarized in Table 10. For these tests, the endpoint was after 9000 Rocker-Drum cycles were completed or when the cut rate for a sample dropped to less than about 30% of the maximum interval cut recorded for that sample. The Rocker-Drum test results are summarized in Table 10.

TABLE 10

Rocker drum test results for Examples #15–#18

| Test interval (cycles) | Comparative Example C Interval cut (g) | Comparative Example D Interval cut (g) | Example #15 Interval cut (g) | Example #16 Interval cut (g) | Example #17 Interval cut (g) | Example #18 Interval cut (g) |
|---|---|---|---|---|---|---|
| 1000 | 1.13 | 1.81 | 2.14 | 1.03 | 2.14 | 1.08 |
| 2000 | 1.29 | 1.79 | 2.32 | 1.16 | 2.42 | 1.18 |
| 3000 | 1.32 | 1.78 | 2.33 | 1.16 | 2.38 | 1.24 |
| 4000 | 1.39 | 1.77 | 2.33 | 1.18 | 2.43 | 1.25 |
| 5000 | 1.36 | 1.61 | 2.28 | 1.14 | 2.39 | 1.22 |
| 6000 | 1.41 | 1.17 | 2.02 | 1.16 | 2.41 | 1.17 |
| 7000 | 1.48 | 0.24 | 1.54 | 1.11 | 2.45 | 1.12 |
| 8000 | 1.47 | — | 1.44 | 1.08 | 2.56 | 1.08 |
| 9000 | 1.51 | — | 1.19 | 1.02 | 2.52 | 0.95 |
| Total Cut (g) | 12.36 | 10.17 | 17.59 | 10.04 | 21.70 | 11.21 |

Table 10 shows that the ceramic aggregate particles made in Example #17, which included alumina and REO, provided a maximum cut rate of 170% of that for the abrasive article in Comparative Example C and of 140% of that for the abrasive article in Comparative Example D. Compared to the abrasive article made in Example #17, the corresponding abrasive article made in Example #15, which used ceramic aggregate particles that did not include REO, provided similar cut rates initially, but the total cut provided by the abrasive article in Example #15 was limited by shelling of the particles from the backing after about 5000 test cycles. The abrasive article made in Example #17 maintained a consistent cut rate, as measured by the interval cuts, within a range of about 18% from lowest to highest over the duration of the test. The cut rate, as measured by the interval cuts, of the abrasive article in Comparative Example C increased steadily by about 34% over the duration of the test. The abrasive article made in Comparative Example D maintained a consistent cut rate, as measured by the interval cuts, over the first few test intervals, but then decreased abruptly as the sample wore through the abrasive coating to the backing. The cut rates, as measured by the interval cuts, of the abrasive articles made in Examples #16 and #18 were similar, but were about half the cut rates, as measured by the interval cuts, provided by the abrasive articles made in Examples #15 and #17.

Particle Crush Strength Values for particles made in Examples #15–#19 were measured according to Test Procedure #2. The Crush Strength Values reported in Table 11 were the averages of at least 40 particles from a give sample of ceramic aggregate particles.

TABLE 11

Crush Test results for Examples #15–#19

| | Example #15 | Example #16 | Example #17 | Example #18 | Example #19 |
|---|---|---|---|---|---|
| Average Crush Strength Value (lb/N) | 17.4/77.5 | 22.3/99.2 | 7.78/34.6 | 10.2/45.4 | 9.7/43.1 |
| Standard Deviation (lb/N) | 2.9/12.9 | 3.2/14.4 | 1.85/8.2 | 2.79/12.4 | 2.6/11.6 |

Example #20

In Example #20, ceramic aggregate particles were made to demonstrate that the method of the present invention could be used to make ceramic aggregate particles containing grinding aid. Ceramic aggregate precursor slurry was prepared as described in Procedure #1, using grinding aid particulates (CRY) and non-crystalline ceramic binder precursor (SGP). The particle slurry formulation is listed in Table 12 and was combined by first combining the ingredients in Table 12 in the order listed except for the CRY and SGP. The CRY and SGP were first combined together and then slowly added to the remaining ingredients in Table 12.

TABLE 12

Particle slurry formulation for Example #20

| Material | Quantity (g) |
|---|---|
| TMPTA | 300 |
| KB1 | 3.0 |
| CH | 2.0 |
| SGP | 400 |
| CRY | 1200 |
| Total inorganic solids content | 84 wt % |

Mixing was done in a mixer with a flat beater rotor (obtained from Hobart Corporation, Troy, Ohio, model number A120T). The CRY/SGP mixture was added to the resin mixture, and mixing was continued at the slowest mixing speed for about 30 minutes as described in Procedure #2. The final temperature of the mixture was about 100° F. (38° C.). Ceramic aggregate precursor particles were made as described in Procedure #2. The "QUADRO COMIL" was set up with a solid impeller (Arrow 1701), a 0.075 inch (1.90 mm) gap, a conical screen with 0.055 inch (1.40 mm) round orifices, and the drive motor was set at 253 rpm. After passing the slurry through the "QUADRO COMIL" and UV curing system, the at least partially-cured ceramic aggregate precursor particles were placed in aluminum pans and thermally-cured in a forced-air oven (obtained from Lindberg/Blue M Company, Watertown, Wis.; model number POM-246F) for about 6 hours at about 350° F. (177° C.).

Precursor particles were screened using a sieve shaker (obtained from W.S. Tyler, Mentor, Ohio; model number RX 29) and 8 inch (20.3 cm) diameter brass sieves (obtained from W.S. Tyler, Mentor, Ohio). Particles that passed through a #12 screen but remained on a #20 screen were collected and prefired as described in Procedure #3. Prefired particles were then reheated to 1132° F. (750° C.) as described in Procedure #3. The fired particles were screened, washed, and dried as described in Procedure #2, and the crush strength of fired particles was measured as described in Test Procedure #2. The average crush strength of particles in Example #20 was 5.3 lbs. (2.4 kg).

Examples #21–22

In Examples 21 and 22, ceramic aggregate particles were made using non-crystalline ceramic binder precursor. Example 21 was made without coloring pigment and Example 22 was made with coloring pigment (10). Ceramic aggregate precursor slurry was prepared as described in Procedure #1. The slurry formulations are listed in Table 13 and were combined by first combining the ingredients in Table 13 in the order listed, except that in Example 22, SGP and IO were first combined together and then slowly added to the remaining ingredients in Table 13.

TABLE 13

Precursor particle slurry formulations for Examples #21 and #22

| Material | Example 21 Quantity (g) | Example 22 Quantity (g) |
|---|---|---|
| TMPTA | 693 | 300 |
| KB1 | 6.9 | 3.0 |
| CH | 4.0 | 2.0 |
| SCA | 28 | — |
| SGP | 2500 | 1000 |
| IO | — | 50 |
| Total inorganic solids content | 77 | 77 |

Mixing was done in a mixer with a flat beater rotor (obtained from Hobart Corporation, Troy, Ohio: model number A120T). The SGP (Example #21) or SGP/IO mixture (Example #22) were added to each separate resin mixture, and mixing was continued at the slowest mixing speed for about 30 minutes as described in Procedure #2. The final temperature of each mixture was about 100° F. (38° C.). Ceramic aggregate precursor particles were made as described in Procedure #2. For Example #21, the "QUADRO COMIL" was set up with a solid impeller (Arrow 1701), a 0.075 inch (1.90 mm) gap, a conical screen with 0.062 inch (1.57 mm) round grater-type orifices, and the drive motor was set at 350 rpm. For Example #22, the "QUADRO COMIL" was set up with a solid impeller (Arrow 1701), a 0.075 inch (1.90 mm) gap, a conical screen with 0.055 inch (1.57 mm) round orifices, and the drive motor was set at 253 rpm. After passing the slurries through the "QUADRO COMIL" and UV curing system, the at least partially-cured ceramic aggregate precursor particles were place in aluminum pans and thermally-cured in a forced-air oven (obtained from Lindberg/Blue M Company, Watertown, Wis.; model number POM-246F) for about 6 hours at about 350° F. (177° C.). For Example #21, the ceramic aggregate precursor particles were then reduced in size by causing them to pass through the "QUADRO COMIL" using a solid impeller (Arrow 1701) at a 0.175 inch (4.44 mm) gap and a 0.094 inch (2.39 mm) grater screen. After the reduction in size, the ceramic aggregate precursor particles for Example #21 were screened using a vibratory grader (obtained from Exolon Co., Tonawanda, N.Y., model number 501). Particles that passed through a #8 mesh screen but remained on a #24 mesh screen were collected and prefired as described in Procedure #2. For Example #22, ceramic aggregate precursor particles were not processed further to reduce their size, but were screened using a sieve shaker (obtained from W.S. Tyler, Mentor, Ohio; model number RX 29) and 8 inch (20.3 cm) diameter brass sieves (obtained from W.S. Tyler, Mentor, Ohio). Particles that passed through a #12 screen but remained on a #20 screen were collected and prefired as described in Procedure #2. Ceramic aggregate particles for Examples #21 and #22 were then reheated to 1382° F. (750° C.) as described in Procedure #2. The fired particles for each Examples #21 and #22 were screened, washed, and dried as described in Procedure #2, and the crush strength of fired particles was measured as described in Test Procedure #2. Fired particles from Example #21 appeared shiny, white, and translucent, and the average crush strength was 53.6 lbs. (24.3 kg). Fired particles from Example #22 appeared shiny, red, and opaque, and the average crush strength was 44.8 lbs. (20.3 kg).

Crush Strength Values for Different Abrasive Grain to Ceramic Bond Phase Ratios

Table 14 is designed to demonstrate the effect of abrasive grain to ceramic bond phase ratio on Crush Strength Value. The weight and volume ratios of abrasive grain to ceramic bond phases are listed in Table 14 for ceramic aggregate particles of selected examples, along with corresponding Crush Strength Values measured according to Test Procedure #2.

For glass-bonded ceramic aggregate particles (i.e., Examples #1, #2, #3, and #8) the actual volume ratio of abrasive grains to glass bond phase was determined as follows: ceramic aggregate particles for each given example were dried for about 2 hours at about 100° C. in a forced-air oven (obtained from Despach Industries, Minneapolis, Minn.; model number ALD2-11) in order to remove moisture from the surface of the particles. Then, the Total Volume of about 10 grams of particles for each given example was measured by helium pycnometry using a "ACCU PYC 1330" (obtained from Micromeritics Inc., Norcross, Ga., under the trade designation "ACCU PYC 1330"). For each of Examples #1, #2, #3, and #8 the ceramic aggregate particles were soaked in 30% hydrofluoric acid for about 2 hours which dissolved the glass bond phase but not the abrasive grains. The hydrofluoric acid solution was decanted and the abrasive grains removed. The abrasive grains were washed with deionized water and dried for about 2 hours at about 100° C. in the forced-air oven (obtained from Despach Industries, Minneapolis, Minn.; model number ALD2-11) to remove moisture. The volume of the remaining abrasive grains was measured by helium pycnometry using the "ACCU PYC 1330." The volume ratios and percentages of abrasive grain to glass bond phase were calculated and listed in Table 14. For the alumina-bonded ceramic aggregate particles (i.e., Examples #16 and #18), volume ratios were estimated from the weight fractions of abrasive grain and alumina bond phases assuming nominal material densities of 4.00 g/cc for both the abrasive grain and alumina bond phases. These data are summarized in Table 14.

TABLE 14

Crush Strength Values for Different Abrasive Grain to Ceramic Bond Phase Ratios

| Example Particles | | Ratio - Abrasive Grain:Bond | | Percent Abrasive Grain | | Average Crush |
|---|---|---|---|---|---|---|
| Sample, abrasive grade and type | Bond type | By weight | By volume | By weight (wt %) | By volume (vol %) | Strength (lb) |
| Example #1 #100 AG321 | Glass | 3.0:1 | 1.62:1 | 75.0 | 61.8 | 25.7 |
| Example #2 #60 AG321 | Glass | 1.5:1 | 0.81:1 | 60.0 | 44.7 | >>60 |
| Example #3 #60 AG321 | Glass | 3.0:1 | 1.62:1 | 75.0 | 61.8 | 44.0 |
| Example #8 #60/P320 AG321 | Glass | 2.5:1 | 1.16:1 | 71.4 | 53.7 | 41.3 |
| Example #16 #60/P320 AG321 | REO-alumina | 2.5:1 | 2.5:1 | 71.4 | 71.4 | 22.3 |
| Example #18 P80 AO | REO-alumina | 2.5:1 | 2.5:1 | 71.4 | 71.4 | 10.2 |

Table 14 illustrates that higher ceramic binder content results in higher particle strength.

We claim:

1. A plurality of ceramic aggregate particles
said particles comprising a plurality of solid particulates bonded together by ceramic binding material, wherein the plurality of solid particulates have an average particle size in the range from about 0.5 microns to about 1500 microns and the ceramic binding material and plurality of solid particulates are separate phases; and
wherein a majority of said plurality of ceramic aggregate particles have a substantially uniform cross-sectional shape.

2. The plurality of ceramic aggregate particles of claim 1, wherein at least a portion of the solid particulates are abrasive particulates having particle sizes between about 125 microns and 1500 microns.

3. The plurality of ceramic aggregate particles of claim 2, wherein the abrasive particulates are selected from the group consisting of fused aluminum oxide, ceramic aluminum oxide, white fused aluminum oxide, heat treated aluminum oxide, silica, silicon carbide, green silicon carbide, alumina zirconia, diamond, ceria, cubic boron nitride, garnet, tripoli, or combinations thereof.

4. The plurality of ceramic aggregate particles of claim 1, wherein a major portion of the ceramic aggregate particles have an aspect ratio greater than one.

5. A plurality of ceramic aggregate particles according to claim 1, wherein a major portion of the ceramic aggregate particles are rod-shaped.

6. A plurality of ceramic aggregate particles according to claim 1, wherein the ceramic binding material comprises ceramic binder selected from the group consisting of crystalline ceramic binder, non-crystalline ceramic binder, and combinations thereof.

7. A plurality of ceramic aggregate particles according to claim 6, wherein the crystalline ceramic binder is selected from the group consisting of aluminum oxide, magnesium oxide, titanium oxide, zirconium oxide, alumina-zirconia, aluminum silicate, magnesium aluminate, magnesium silicate, boron carbide, silicon carbide, silicon-aluminum-oxynitride, titanium carbide, boron nitride, silicon nitride, silicon oxynitride, aluminum nitride, titanium boride, calcium phosphate, and combinations thereof.

8. A plurality of ceramic aggregate particles according to claim 6, wherein the non-crystalline ceramic binder is selected from the group consisting of fused silica, alkali silicate glass, alkaline earth silicate glass, lead silicate glass, borosilicate glass, aluminosilicate glass, aluminophosphate glass, and combinations thereof.

9. A plurality of ceramic aggregate particles according to claim 6, wherein the ceramic binding material comprises a combination of crystalline ceramic binder and non-crystalline ceramic binder and is selected from the group consisting of lithium aluminosilicate glass ceramic, magnesium aluminosilicate glass ceramic, fluoromica silicate glass ceramic, porcelain, earthenware, stoneware, and combinations thereof.

10. A plurality of ceramic aggregate particles according to claim 1, wherein a major portion of the ceramic aggregate particles have a circular cross-sectional shape.

11. A plurality of ceramic aggregate particles according to claim 1, wherein a major portion of the ceramic aggregate particles have a polygonal cross-sectional shape.

12. A plurality of ceramic aggregate particles according to claim 1, wherein a major portion of the ceramic aggregate particles have surface connected porosity.

13. A plurality of ceramic aggregate particles according to claim 1, wherein a major portion of the ceramic aggregate particles have no appreciable surface connected porosity.

14. An abrasive article including:
binder material; and
a plurality of ceramic aggregate particles according to claim 2, secured within said article by said binder material.

15. A coated abrasive comprising:
a backing having a major surface; and
an abrasive layer comprising a plurality of ceramic aggregate particles according to claim 2, secured to said major surface of said backing by binder material.

16. A nonwoven abrasive article comprising:
a porous lofty polymer filament structure having a plurality of ceramic aggregate particles according to claim 2, distributed throughout the structure and bonded therein by an organic binder.

17. A plurality of ceramic aggregate particles comprising a plurality of solid particulates bonded together by ceramic binding material, wherein the ceramic aggregate particles have a ceramic binder volume to solid particulate volume ration in the range from about 0.2 to about 2.0 and the ceramic aggregate particles have a substantially uniform cross sectional shape.

18. A plurality of ceramic aggregate particles comprising a plurality of solid particulates bonded together by ceramic binding material, wherein the ceramic aggregate particles have a ceramic binder volume to solid particulate volume ration in the range from about 0.2 to about 2.0 and wherein a major portion of the ceramic aggregate particles have a circular cross-sectional shape.

19. A plurality of ceramic aggregate particles comprising a plurality of solid particulates bonded together by ceramic binding material, wherein the ceramic aggregate particles have a ceramic binder volume to solid particulate volume ration in the range from about 0.2 to about 2.0 and wherein a major portion of the ceramic aggregate particles have a polygonal cross-sectional shape.

20. A plurality of ceramic aggregate particles comprising a plurality of solid particulates bonded together by ceramic binding material, wherein the ceramic aggregate particles have a ceramic binder volume to solid particulate volume ration in the range from about 0.2 to about 2.0 and wherein a major portion of said particles have surface connected porosity.

21. A plurality of ceramic aggregate particles comprising a plurality of solid particulates bonded together by ceramic binding material, wherein the ceramic aggregate particles have a ceramic binder volume to solid particulate volume ration in the range from about 0.2 to about 2.0 and wherein said ceramic binder comprises, on a theoretical oxide basis, at least 95 percent by weight $Al_2O_3$, based on the total metal oxide content of said ceramic binder.

22. A plurality of ceramic aggregate particles comprising a plurality of solid particulates coated and bonded together by a ceramic binding material, wherein the ceramic binding material coats each exterior surface of the solid particulate, with a coating such that the exterior surface of the aggregate particle closely conforms to the outermost surfaces of the solid particulates therein, and wherein the thickness of the binding material coating the outermost surfaces is no greater than about 0.05 microns to 150 microns.

* * * * *

UNITED STATES PATENT AND TRADEMARK OFFICE
CERTIFICATE OF CORRECTION

PATENT NO. : 6,881,483 B2
DATED : April 19, 2005
INVENTOR(S) : McArdle, James L.

It is certified that error appears in the above-identified patent and that said Letters Patent is hereby corrected as shown below:

<u>Column 15,</u>
Line 22, after "example" insert -- round, flat --
Lines 25-26, delete "micometers" and insert -- micrometers --

<u>Column 17,</u>
Line 15, delete "x·100" and insert -- x 100 --

<u>Column 24,</u>
Line 14, delete "Avemakke" and insert -- Avernakke --

<u>Column 38,</u>
Line 45, after "about" insert -- 15 --

<u>Column 41,</u>
Line 18, delete "(10)" and insert -- (IO) --

Signed and Sealed this

Fifth Day of July, 2005

JON W. DUDAS
*Director of the United States Patent and Trademark Office*